United States Patent
Kimmel

(10) Patent No.: US 9,600,993 B2
(45) Date of Patent: Mar. 21, 2017

(54) METHOD AND SYSTEM FOR BEHAVIOR DETECTION

(71) Applicant: Atlas5D, Inc., Cambridge, MA (US)

(72) Inventor: Zebadiah M. Kimmel, Cambridge, MA (US)

(73) Assignee: ATLAS5D, INC., Cambridge, MA (US)

( * ) Notice: Subject to any disclaimer, the term of this patent is extended or adjusted under 35 U.S.C. 154(b) by 166 days.

(21) Appl. No.: 14/604,582

(22) Filed: Jan. 23, 2015

(65) Prior Publication Data

US 2015/0213702 A1    Jul. 30, 2015

Related U.S. Application Data

(60) Provisional application No. 61/932,215, filed on Jan. 27, 2014.

(51) Int. Cl.
*G06K 9/00* (2006.01)
*G08B 21/04* (2006.01)
(Continued)

(52) U.S. Cl.
CPC ....... *G08B 21/043* (2013.01); *G06K 9/00335* (2013.01); *G06K 9/00771* (2013.01); *G06T 7/20* (2013.01); *G06T 7/62* (2017.01); *G08B 21/02* (2013.01); *G08B 21/0423* (2013.01); *H04N 7/183* (2013.01); *G06T 2207/30196* (2013.01)

(58) Field of Classification Search
None
See application file for complete search history.

(56) References Cited

U.S. PATENT DOCUMENTS

| 4,406,544 A | 9/1983 | Takada et al. |
| 4,650,330 A | 3/1987 | Fujita |

(Continued)

FOREIGN PATENT DOCUMENTS

| WO | WO-01/01354 A1 | 1/2001 |
| WO | WO-2013/058985 A1 | 4/2013 |
| WO | WO-2014/112632 A1 | 7/2014 |

OTHER PUBLICATIONS

Loker et al., "Size-specific Analysis of Body Scan Data to Improve Apparel Fit," Journal of Textile and Apparel, Technology and Management, 4(3): 4-6 (2005).

(Continued)

*Primary Examiner* — Soo Jin Park
(74) *Attorney, Agent, or Firm* — Choate, Hall & Stewart LLP; William R. Haulbrook

(57) ABSTRACT

Described herein are systems and methods for automatically detecting a behavior of a monitored individual, for example, that the individual has fallen. In certain embodiments, a system is presented that includes one energy sensor (e.g., a camera of a mobile electronic device) configured to capture reflected energy (e.g., light) within a field-of view; an optional lens to modify the distance or angular range of the field-of-view; and an optional image obfuscator to blur or distort the images received by the energy sensor, thereby preserving privacy. Techniques are described for determining spatial measurements and body measurements from the images and using these measurements to identify a behavior of the monitored individual, for example, a fall.

16 Claims, 24 Drawing Sheets

(51) Int. Cl.
*H04N 7/18* (2006.01)
*G06T 7/20* (2006.01)
*G08B 21/02* (2006.01)

(56) References Cited

U.S. PATENT DOCUMENTS

| | | | |
|---|---|---|---|
| 5,530,652 A | 6/1996 | Croyle et al. | |
| 5,742,521 A | 4/1998 | Ellenby et al. | |
| 7,440,590 B1 | 10/2008 | Hassebrook et al. | |
| 8,269,834 B2 | 9/2012 | Albertson et al. | |
| 8,639,020 B1 | 1/2014 | Kutliroff et al. | |
| 8,644,556 B2 * | 2/2014 | Zhou | G06F 3/017 348/169 |
| 8,787,663 B2 | 7/2014 | Litvak et al. | |
| 8,792,722 B2 * | 7/2014 | Liu | G06K 9/00355 382/181 |
| 8,902,198 B1 * | 12/2014 | Karakotsios | G06F 3/017 345/175 |
| 9,075,444 B2 * | 7/2015 | Noda | G06F 3/017 |
| 9,341,464 B2 | 5/2016 | Kimmel | |
| 9,361,696 B2 | 6/2016 | Allezard et al. | |
| 9,393,695 B2 | 7/2016 | Scott et al. | |
| 2003/0076414 A1 | 4/2003 | Sato et al. | |
| 2003/0209893 A1 | 11/2003 | Breed et al. | |
| 2003/0231788 A1 | 12/2003 | Yukhin et al. | |
| 2004/0083142 A1 | 4/2004 | Kozzinn | |
| 2004/0236456 A1 | 11/2004 | Pieper et al. | |
| 2007/0229850 A1 | 10/2007 | Herber | |
| 2007/0252831 A1 | 11/2007 | Lind et al. | |
| 2009/0103780 A1 * | 4/2009 | Nishihara | G06F 3/017 382/103 |
| 2009/0244309 A1 | 10/2009 | Maison et al. | |
| 2010/0007717 A1 | 1/2010 | Spektor et al. | |
| 2010/0172567 A1 | 7/2010 | Prokoski | |
| 2010/0191541 A1 | 7/2010 | Prokoski | |
| 2010/0226533 A1 | 9/2010 | Bharath et al. | |
| 2011/0052006 A1 | 3/2011 | Gurman et al. | |
| 2011/0193939 A1 | 8/2011 | Vassigh et al. | |
| 2011/0205337 A1 | 8/2011 | Ganapathi et al. | |
| 2011/0206273 A1 | 8/2011 | Plagemann et al. | |
| 2011/0211044 A1 | 9/2011 | Shpunt et al. | |
| 2011/0211754 A1 | 9/2011 | Litvak et al. | |
| 2011/0288964 A1 | 11/2011 | Linder et al. | |
| 2011/0298801 A1 | 12/2011 | Wexler et al. | |
| 2012/0076361 A1 | 3/2012 | Fujiyoshi | |
| 2012/0128327 A1 | 5/2012 | Matsubara | |
| 2012/0146903 A1 * | 6/2012 | Arihara | G06F 3/011 345/158 |
| 2012/0159290 A1 | 6/2012 | Pulsipher et al. | |
| 2012/0162483 A1 | 6/2012 | Sutton et al. | |
| 2012/0229634 A1 | 9/2012 | Laett et al. | |
| 2012/0242501 A1 | 9/2012 | Tran et al. | |
| 2012/0257814 A1 | 10/2012 | Kohli et al. | |
| 2012/0269384 A1 | 10/2012 | Jones et al. | |
| 2012/0326959 A1 | 12/2012 | Murthi et al. | |
| 2013/0088426 A1 * | 4/2013 | Shigeta | G06F 3/017 345/156 |
| 2013/0163879 A1 | 6/2013 | Katz et al. | |
| 2013/0182898 A1 * | 7/2013 | Maeda | G06K 9/00228 382/103 |
| 2014/0241571 A1 * | 8/2014 | Bilet | G06K 9/00342 382/103 |
| 2014/0243686 A1 | 8/2014 | Kimmel | |
| 2014/0279740 A1 | 9/2014 | Wernevi et al. | |
| 2014/0299775 A1 | 10/2014 | Kimmel | |
| 2014/0300907 A1 | 10/2014 | Kimmel | |
| 2015/0213702 A1 | 7/2015 | Kimmel | |
| 2015/0325004 A1 | 11/2015 | Utsunomiya et al. | |
| 2016/0267652 A1 | 9/2016 | Kimmel et al. | |
| 2016/0331277 A1 | 11/2016 | Kimmel | |

OTHER PUBLICATIONS

Viktor et al., "Measuring to Fit: Virtual Tailoring through Cluster Analysis and Classification," NRC Publications Archive, entire document (2006).
European Search Report, EP 16 15 9917, 2 pages, Jul. 7, 2016.

* cited by examiner

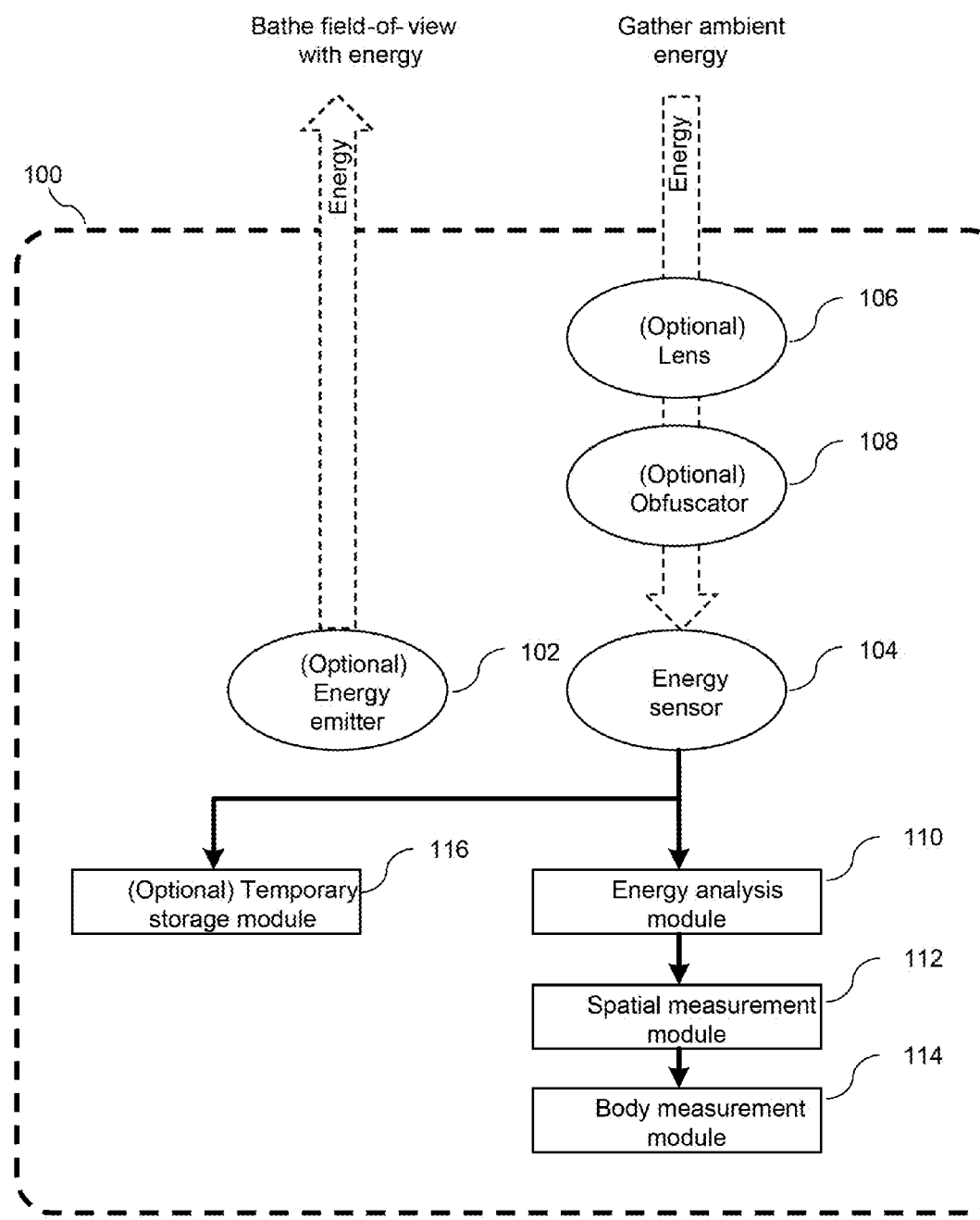

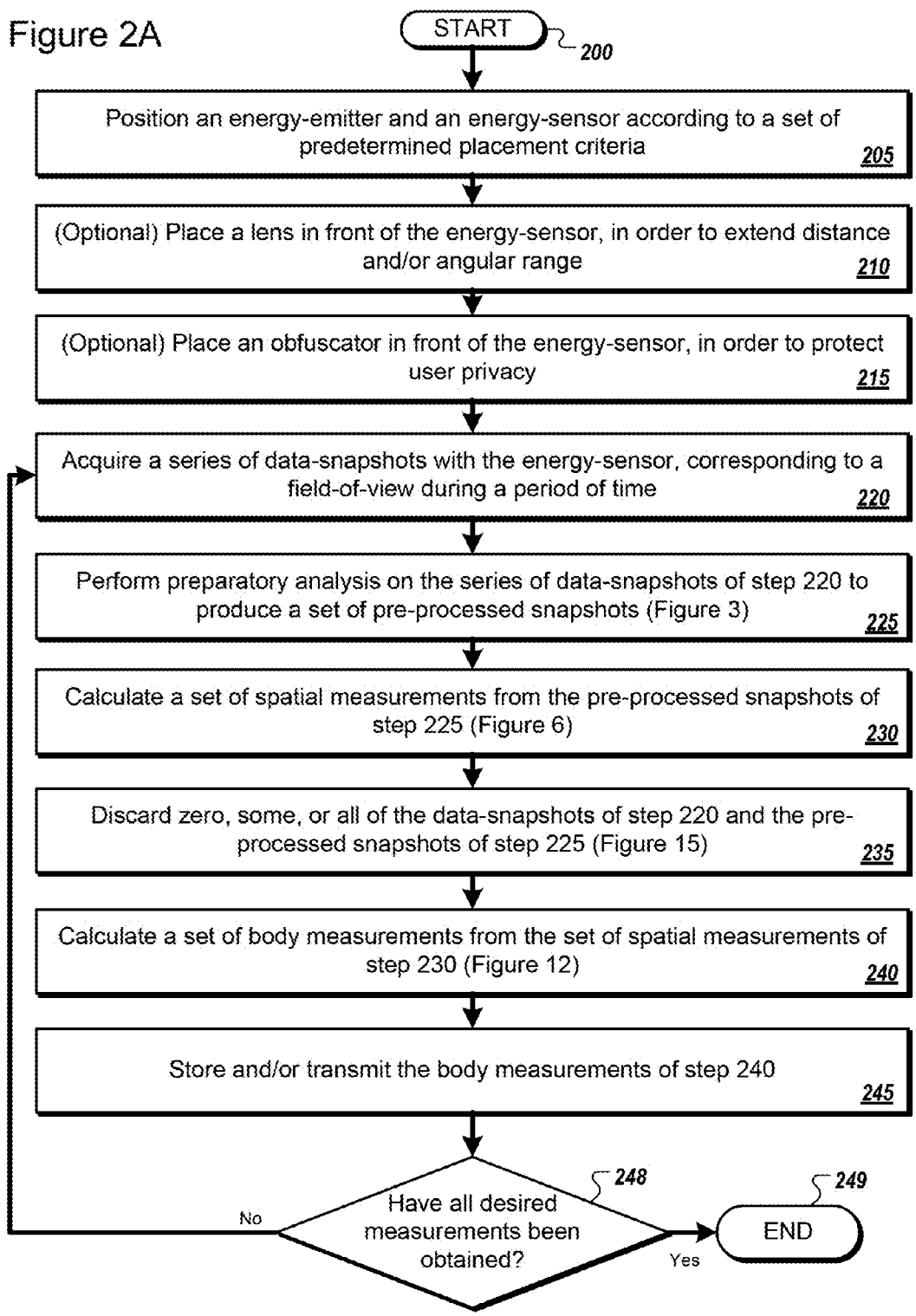

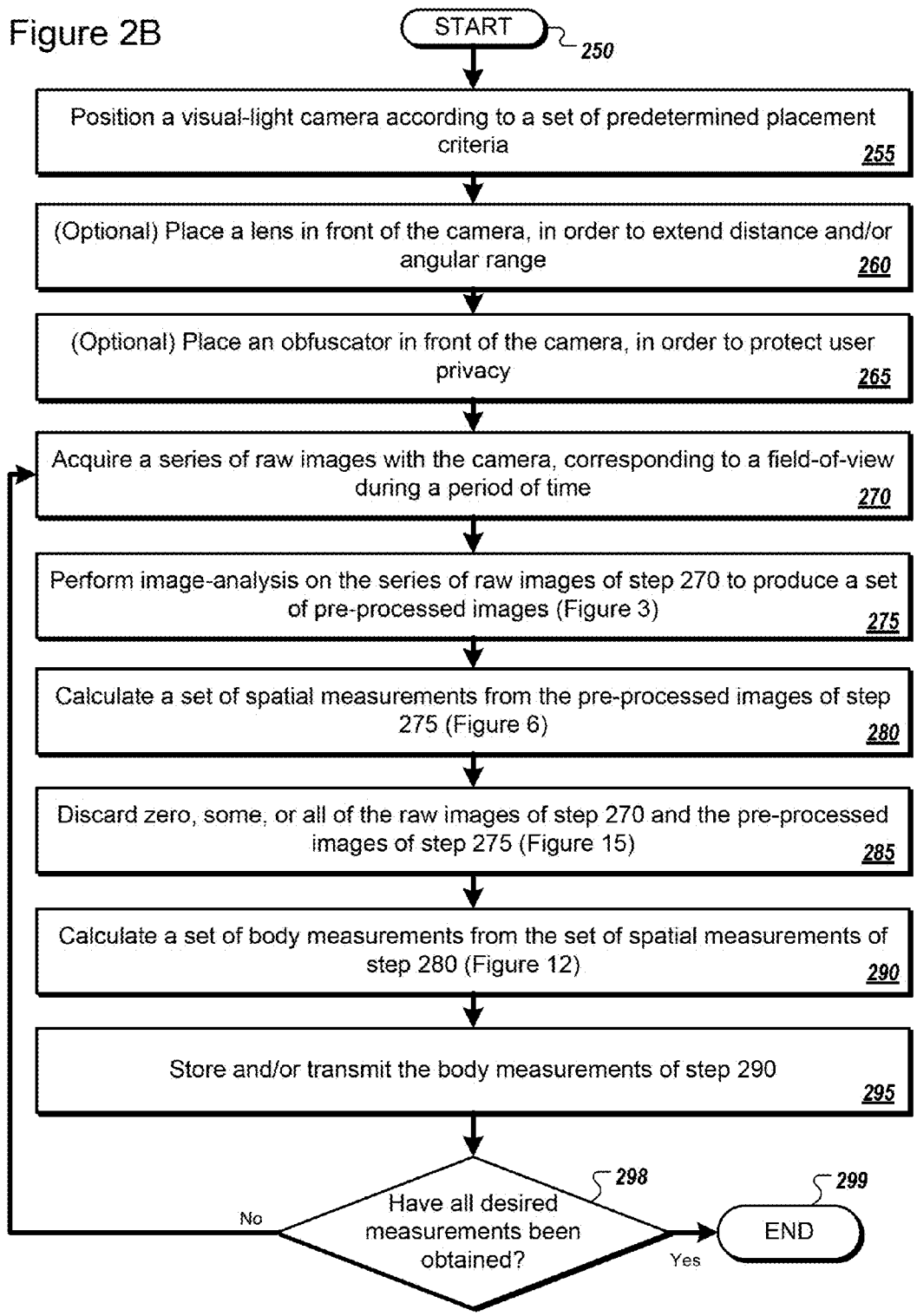

Figure 3

| Pre-processing operation | Speed | Accepts obfuscation |
|---|---|---|
| • Resize | • Very fast | • Yes |
| • Convert to grayscale | • Very fast | • Yes |
| • Threshold | • Very fast | • Yes |
| • Subtract aka diff | • Very fast | • Yes |
| • Bitwise logical | • Very fast | • Yes |
| • Filter | • Fast | • Yes |
| • Erode or dilate | • Fast | • Yes |
| • Edge detection | • Fast | • Sometimes |
| • Histogram of gradients | • Slow | • Sometimes |

Time 0 — 400

Time 1 — 410

Time 2 — 420

430

440

450

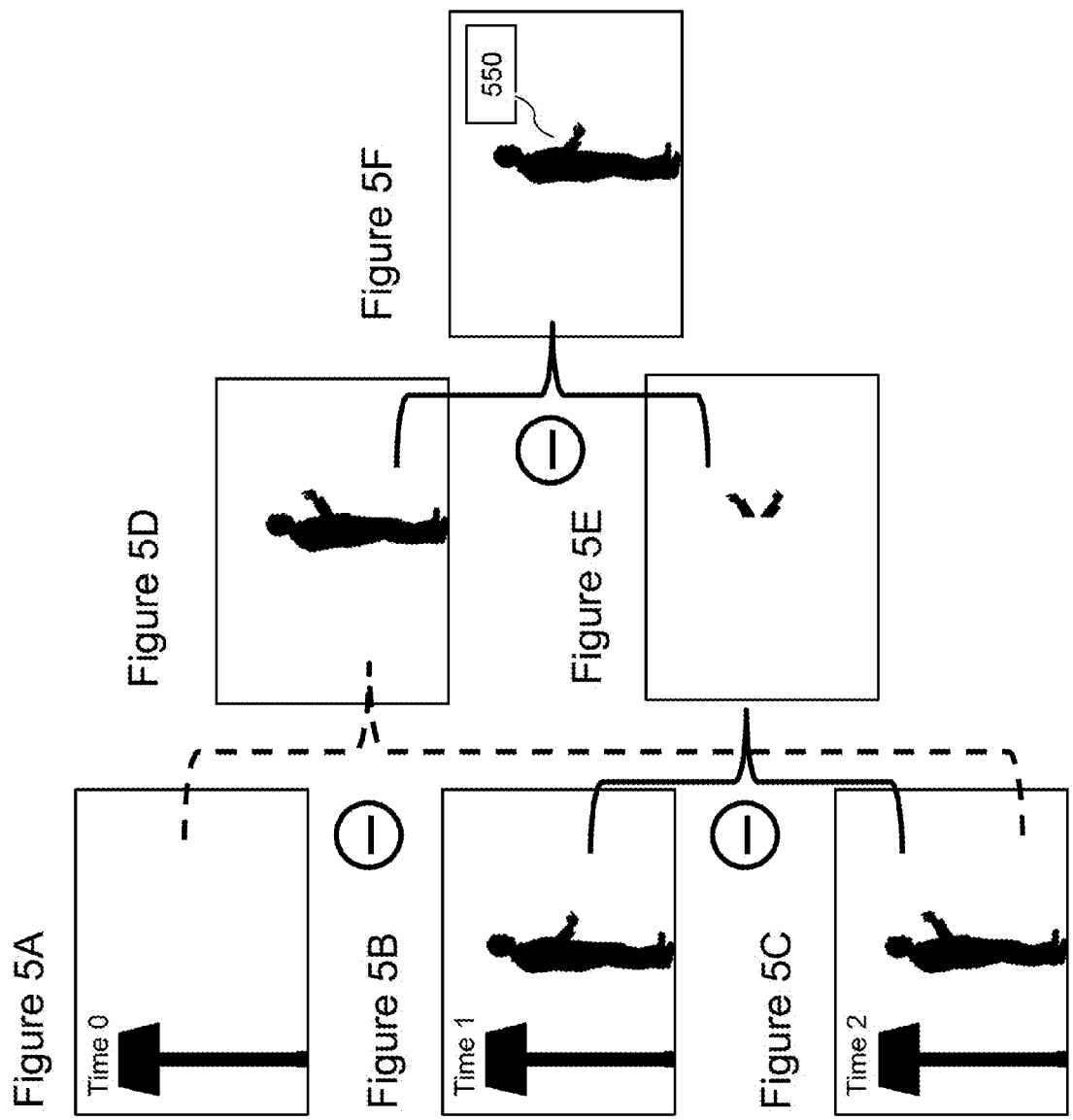

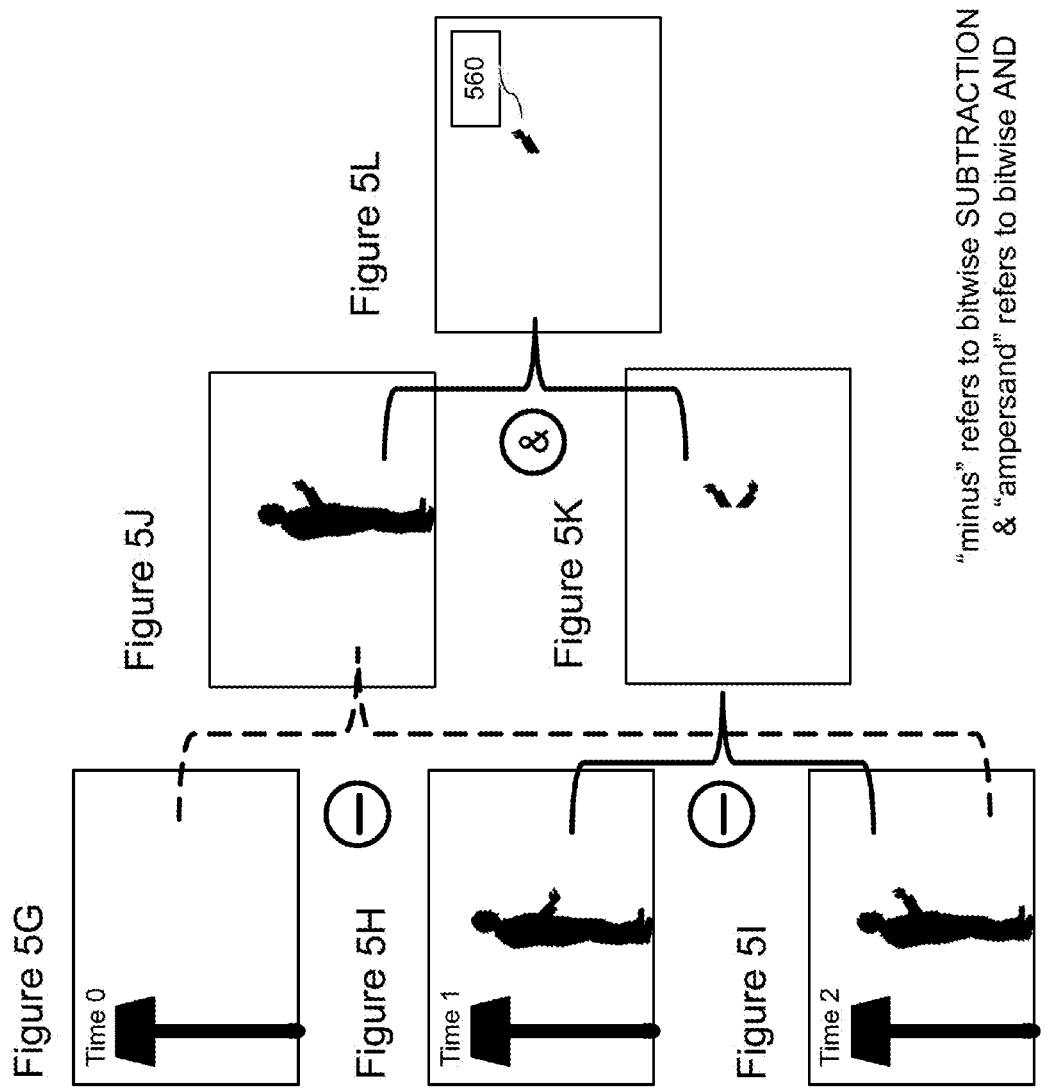

Figure 6

| Spatial measurement | Speed | Accepts obfuscation |
|---|---|---|
| • Topmost pixel row | • Very fast | • Yes |
| • Row-width maxima (Figure 9) | • Fast | • Yes |
| • Corner brightness | • Fast | • Yes |
| • Mask proportion or size | • Fast | • Yes |
| • Centroid | • Fast | • Yes |
| • Curve fitting | • Slow | • Sometimes |
| • Skin-color detection | • Very fast | • Sometimes |
| • Object recognition | • Very slow | • Sometimes |
| • Facial recognition | • Very slow | • No |
| • Sensor tilt (for mathematical adjustment) | • Very fast | • Yes |
| • Bounding dimensions of head (calculated from row-width maxima, above – see Figure 9) | • Fast | • Yes |

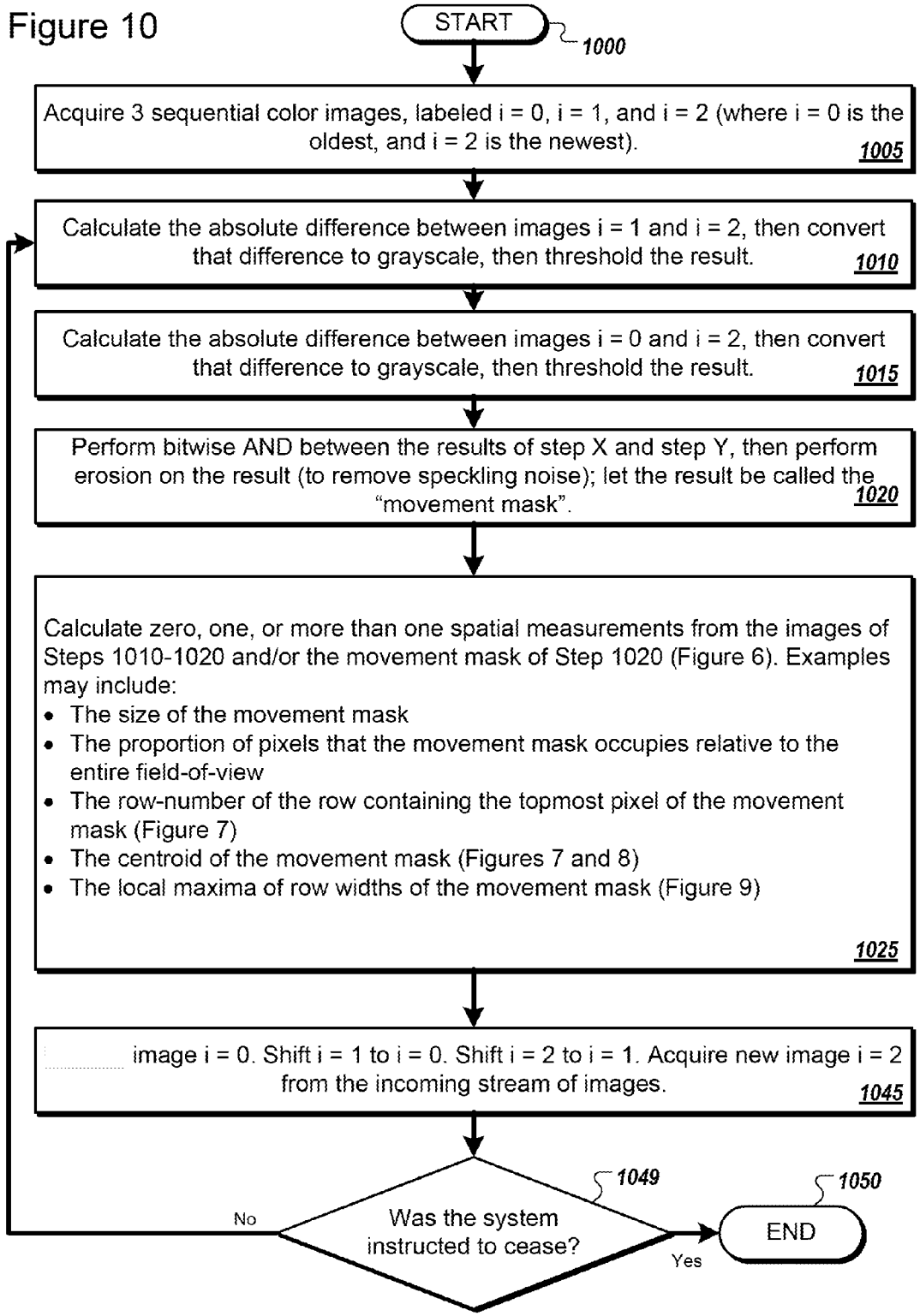

$$(\Delta \text{ z-distance from camera, in mm}) = \frac{(1000-700)}{(100-200)} \cdot (\Delta \text{ width of head, in pixels})$$

Assuming adult human head width = 200 mm, then:

$$(\Delta \text{ x- distance, in mm}) = \frac{200}{100} \cdot (\Delta \text{ x- distance, in pixels}) = \frac{200}{100} \cdot 400$$

Figure 12

| Body measurement | May be calculated from sequential measurements of: (Figure 6) | Use / purpose / event |
|---|---|---|
| Head width | Row-width maxima | Distance calibration |
| Relative position/ velocity of head y-value | Topmost pixel | Fall detection |
| Absolute position/ velocity of head y-value | Topmost pixel and head width | Sitting vs standing |
| Direction of walking movement (x-axis) | Centroid | Presence or absence |
| Direction of walking movement (z-axis) | Head width | Room transit<br>Activity level |
| Relative velocity of walking | Centroid | Changes in activity level |
| Absolute velocity of walking | Centroid and head width | |
| Relative or absolute location of hands | Skin-color detection and object recognition | Dining (hand-to-head periodicity) |

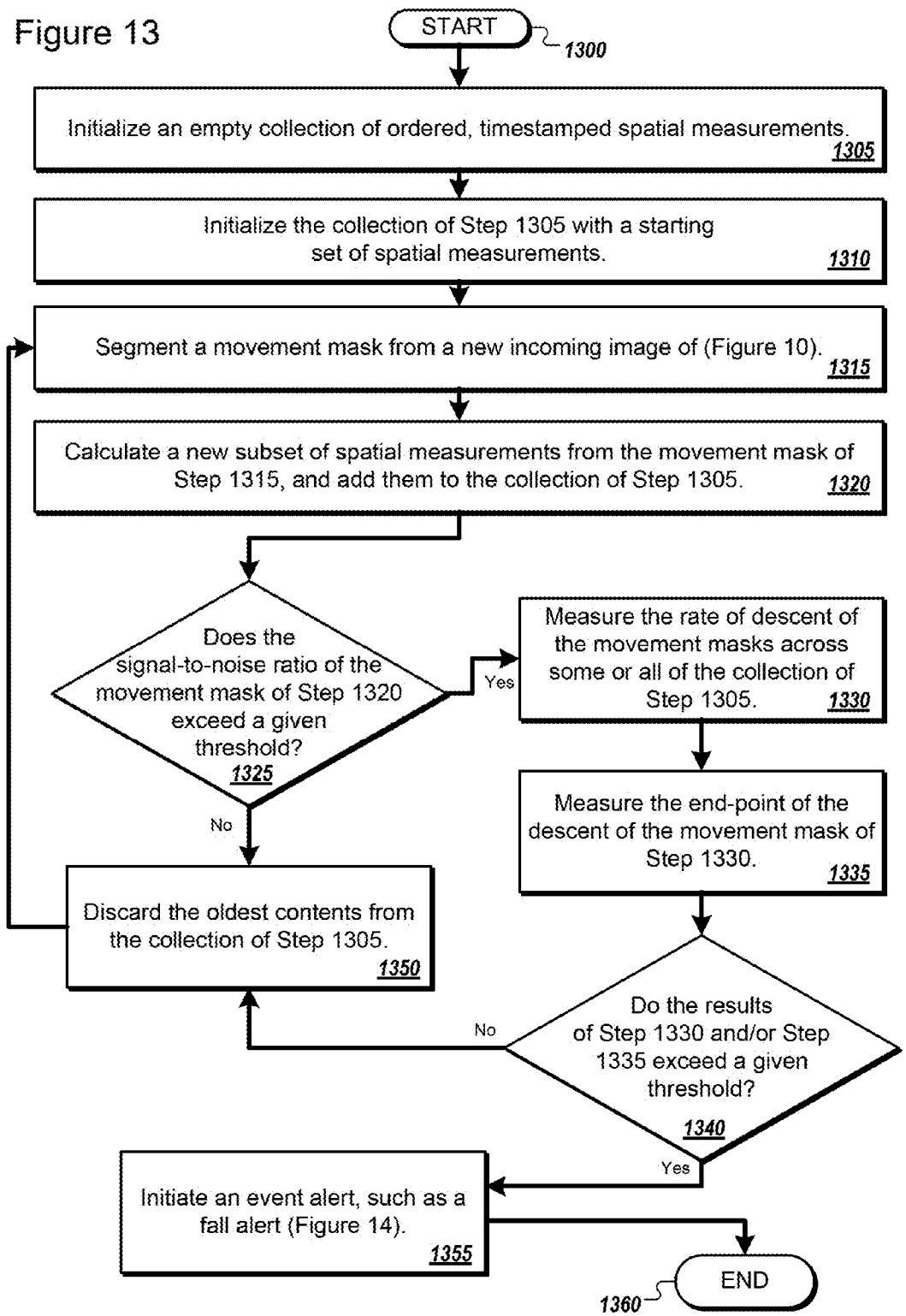

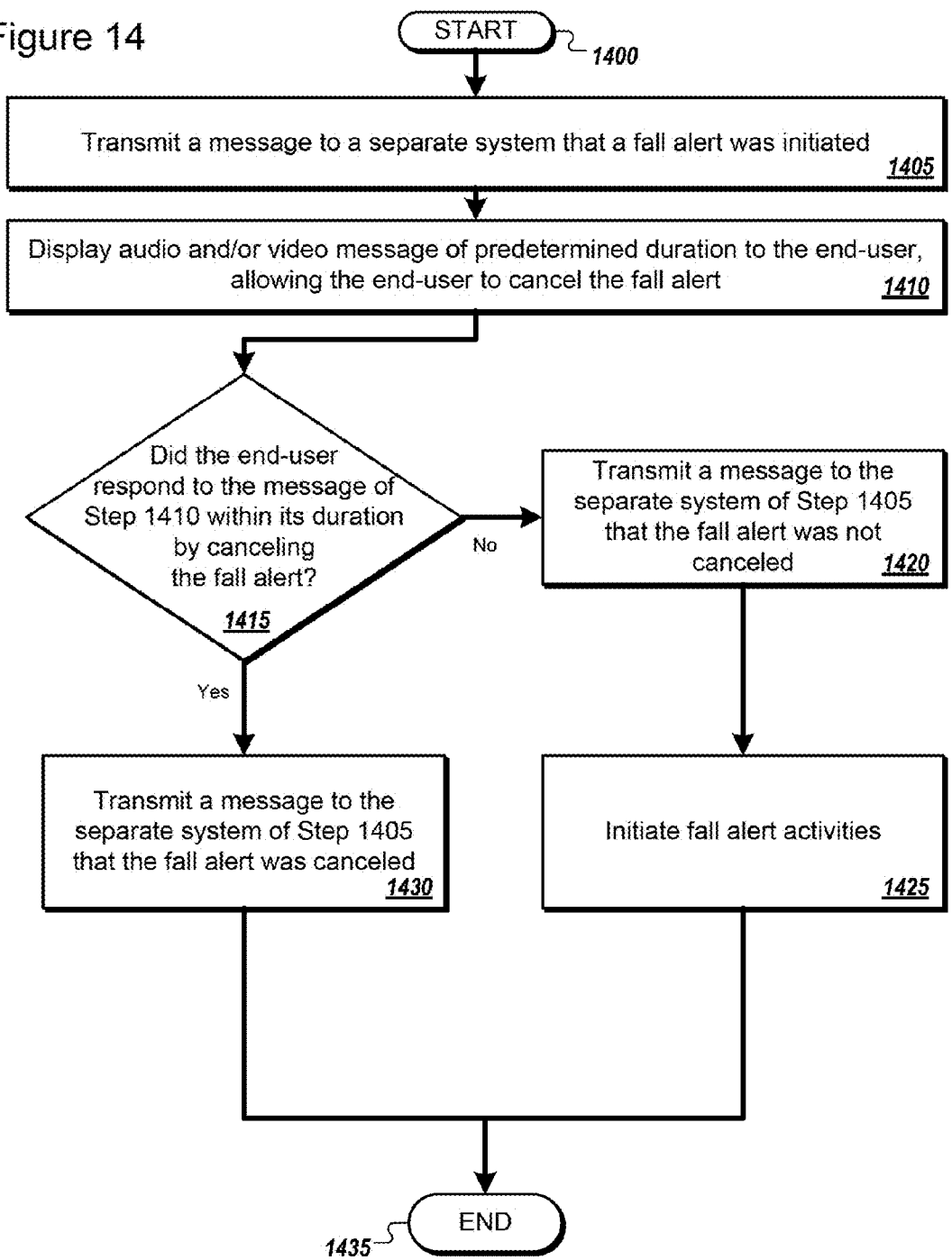

Figure 16

| Source of error | Root cause | Example solutions |
|---|---|---|
| • Sudden change in image lighting (e.g., external light is switched on, or internal camera gain is changed) | • All image pixels change abruptly | • Screen for features that persist for longer than a small fraction of a second, or the time the camera takes to reach steady-state, or<br>• Query camera for gain setting, and adjust image pixels accordingly, or<br>• Adjust each image based on brightness changes, e.g., at image corners |
| • Non-real image of a human appears in field-of-view and is erroneously tracked as a human user | • A TV or window is within the field-of-view | • Require placement such that TVs and windows are not within the field-of-view<br>• Filter out pixels that show frequent, consistent changes for a long time |
| • Pet appears in field-of-view and is erroneously tracked as a human user | • The pet's features imitate a human's features | • Require placement such that height of unit places pets out of field-of-view, or<br>• Screen out shapes, or features, that are confined to some portion of each image, e.g., the lower half of each image, or<br>• Compare length/width of shapes, or features, to look for predominant horizontal instead of vertical stance |
| • Multiple people in field-of-view cause erroneous measurements | • Features overlap, or become confused, among multiple people | • Require placement in areas where typically only one person is present, or<br>• Require addition of other sensors, e.g., depth sensors, to distinguish among multiple people |

METHOD AND SYSTEM FOR BEHAVIOR DETECTION

RELATED APPLICATIONS

The present application claims priority to U.S. Provisional Application No. 61/932,215, filed Jan. 27, 2014, the content of which is hereby incorporated by reference in its entirety.

TECHNICAL FIELD

This invention relates generally to methods and systems for monitoring an individual. More particularly, in certain embodiments, the invention relates to automatic detection of a behavior of an individual, for example, a fall or other physical movement.

BACKGROUND

Fall detection of human beings is an intensifying, unmet need around the world, propelled by burgeoning populations of older individuals. Fall detection is a growing problem for disabled individuals as well—for example, those who are afflicted by epilepsy, juvenile diabetes, muscular dystrophy, multiple sclerosis, narcolepsy, or other conditions which result in sudden unconsciousness or loss of motor control.

At present, most commercially-available systems for fall detection involve a device that must be worn by the end user. Such wearables are usually in the form of either a necklace or a bracelet (worn directly), or a mobile phone (worn in the pocket). Wearable fall-detection mechanisms fall into two classes—manual devices, wherein the user must press a button on the device to call for help, and automatic devices, wherein the device includes an accelerometer and calls for help automatically when a sudden downward movement is detected.

Wearable monitoring devices suffer from various drawbacks. For example, many eligible users resist wearing fall-detection devices due to the stigma associated with the use of such devices. Many wearables are conspicuous, constant reminders of the user's lack of independence. As a result of such psychological resistance, the adoption of wearable sensors is estimated to be only 5-10% of individuals who would otherwise benefit from fall detection.

Wearable monitoring devices are also inconvenient. In order to be effective, they must always be worn, and the wearer must remember that he/she is wearing the device if it requires an action such as the press of a button upon the occurrence of an adverse event. Thus, certain devices are unsuitable for certain cognitively-impaired users.

Wearables may also suffer from poor accuracy. Manual devices often end up trapped under the body of a fallen individual, placing the call-for-help button out of reach of the user upon the occurrence of an adverse event such as a fall, adverse cardiac event, or other medical emergency. Automatic devices may fail to register an actual fall, e.g., by incorrectly interpreting the user as sitting down, or the converse. Estimates of wearable fall-detector accuracy generally top out at 80%, and are typically lower.

Because of these problems, various monitoring systems that do not have a wearable component (e.g., 'touchless' systems) have been proposed. However, these systems have various drawbacks as well.

For example, systems with an audio sensor for detection of the noise of a fall, or a human cry for help, are complex to set up and calibrate for use by a given individual, and real-world accuracy is low. Environmental noise, such as the sound made by televisions, human conversation, outdoor noises, storms, and other events may lead to inaccuracy, including false positives and false negatives. Furthermore, certain adverse events, e.g., certain falls or medical emergencies, are not accompanied by noise, or may not register, depending on the location the event occurs.

Systems that detect certain vibration may include sensors installed in or on the floor, or under the carpet, to detect vibrations that are associated with a fall. These systems may be difficult to set up, they may be expensive, and there are accuracy problems.

Various video sensors have been proposed, but these suffer from drawbacks as well. Most inexpensive motion sensors are not sophisticated enough to detect a fall or other adverse event, and they may be difficult to install. Depth-based sensors for fall detection, for example, infrared-based systems, may be expensive and may operate in a limited range. Current multiple camera systems may be complex to set up, expensive, and pose privacy concerns. Many systems of this kind require manual human verification of detected events. Current single-camera video systems transmit video footage to a monitoring center, or may be accessed by a loved one or caretaker of an individual being monitored. Various video analysis software has been developed in a laboratory setting, but these algorithms are complex and adaptation to real-word environments is questionable. For example, freely-placed camera systems encounter different room shapes and sizes, different placement heights and angular orientations, different backgrounds and light conditions, different furniture configurations, which vary by user as well as temporally. Algorithms that compensate for these variations are complex and do not perform well when used to detect real-world falls.

Thus, current systems are difficult, expensive, time-consuming to install, configure, and maintain. They may store or disseminate images or video, possibly compromising individual privacy. They may require form factors or high-end computational power that is expensive or physically large and therefore difficult to deploy in a home environment. Existing systems also lack accuracy and may require substantial human operation or involvement. Furthermore, existing systems may suffer from lack of compliance due to complexity, inconvenience, or stigma.

There is a need for non-obtrusive, privacy-preserving methods and systems for automatic detection of a behavior of an individual such as a fall or adverse medical event, suitable for in-home use, with improved accuracy, ease of use, and low expense.

SUMMARY OF THE INVENTION

To overcome the above-described problems, some embodiments of the present invention are targeted against a focused set of local conditions. In contrast to known methods, certain embodiments described herein are not designed to be a general-purpose fall detector, applicable for any number of people and any type of environment. Rather, in certain embodiments, the present invention is tailored where the need for fall detection is greatest: helping individuals who spend much time alone in their own home.

Described herein are systems and methods for automatically detecting a behavior of a monitored individual, for example, that the individual has fallen. While the specification may describe the movement in relation to examples involving a fall, the disclosed technology applies to other physical movements as well. In certain embodiments, a system is presented that includes one energy sensor (e.g., a camera of a mobile electronic device) configured to capture reflected energy (e.g., light) within a field-of view; an optional lens to modify the distance or angular range of the field-of-view; and an optional image obfuscator to blur or distort the images received by the energy sensor. Techniques are described for determining spatial measurements and body measurements from the images and using these measurements to identify a behavior of the monitored individual, for example, a fall.

An energy analysis module pre-processes incoming images and identifies shapes or outlines of portions of the individual's body within the field-of-view. A spatial measurement module generates measurements indicative of the movement of the individual. A body measurement module interprets the spatial measurements to determine whether an event of interest, such as a fall, has occurred. The system may be configured to minimize or prevent storage or transmission of images, thereby further safeguarding the individual's privacy.

In one aspect, the invention is directed to a method for automatically detecting a behavior of an individual (e.g., a fall, a presence or absence in a room, walking, sitting, standing, room transit, a direction of movement, an activity level, and/or eating), the method comprising: capturing a sequence of images (e.g., a video stream) of a space at least occasionally inhabited by the individual with a mobile electronic device (e.g., personal computing device with image capture functionality) positioned (e.g., within the space) at a height within a predetermined range of acceptable vertical heights (e.g., at a height from waist level of the individual to head level of the individual, e.g., top of head) and at an angular orientation within a predetermined range of acceptable angular orientations (e.g., from −30° to 30° with respect to horizontal, or from −20° to 20° with respect to horizontal, or from −15° to 15° with respect to horizontal, or from −10° to 10° with respect to horizontal) (e.g., wherein the sequence of images are obfuscated to eliminate detail, thereby providing privacy, e.g. the images are obfuscated via a filter, film, screen, gel, and/or an image-distorting lens, and/or the images are obfuscated digitally following image capture by a processor of a computing device); optionally, pre-processing the captured sequence of images by a processor of a computing device prior to subsequent image processing (e.g., to reduce or eliminate noise, and/or to 'subtract' undesired background and/or non-human elements from the sequence of images, e.g., applying grayscale, threshold, bitwise logical operations {e.g., AND operations, OR operations}, dilation, and/or erosion, e.g., to segment a human figure from background) (e.g., performing cascading subtractions between multiple pairs of images obtained at different times to remove undesired background items while preserving both moving and non-moving portions of a desired human figure); automatically identifying, by the processor of the computing device, graphical elements of the sequence of images (e.g., following the pre-processing step) corresponding to the individual moving within a field of view of the mobile electronic device (e.g., wherein the individual is moving at least at some point in time during which the sequence of images are obtained, not necessarily continually) (e.g., identifying a movement mask corresponding to the individual, e.g., which may subsume the optional pre-processing step, e.g., wherein the movement mask is an estimation, from the sequence of images, of a portion or entirety of a silhouette of a moving individual within the field of view); automatically determining, by the processor of the computing device [e.g., wherein "processor of the computing device" is a processor of the mobile computing device, a processor of a server (e.g., where the images are processed remotely), a processor of a home computer, or any combination of these], one or more spatial measurements from one or more images of the sequence of images (e.g., following pre-processing and/or following removal of all non-moving and/or non-human elements) [e.g., wherein the one or more spatial measurements comprises at least one member selected from the group consisting of: (i) a topmost pixel row (e.g., the row of an image corresponding to a segmented human figure, determined for at least one of the images from the sequence of images, e.g., two or more of the images, for example, to detect a change in head level of the individual); (ii) a row-width maximum (e.g., in an image in which topmost pixel row is determined and presumed to correspond to the top of a human head in the field of view, determine a subsequent row where width between first and last pixels corresponding to the head ceases to increase, thereby determining a middle portion of the head); (iii) a row-width minimum (e.g., in an image in which topmost pixel row is determined and presumed to correspond to the top of a human head in the field of view, determine a subsequent row where width between first and last pixels corresponds to a minimum, thereby determining the neck of the individual); (iv) a corner brightness (e.g., to detect and compensate for initiation of an 'automatic gain' correction being made by the mobile electronic device acquiring the sequence of images, e.g., when the individual moves nearer to the mobile electronic device); (v) an overall brightness of an image excluding the movement mask (e.g., to detect and compensate for initiation of an 'automatic gain' correction being made by the mobile electronic device acquiring the sequence of images, e.g., when the individual moves nearer to the mobile electronic device); and (vi) a mask proportion or size (e.g., ratio of pixels of the movement mask to the total pixels in the field of view, e.g., to determine when the individual has moved too close to the mobile electronic device acquiring the sequence of images to provide accurate results, e.g., thereby reducing false positives when the behavior to be detected is a fall) (e.g., and, optionally, any one or more of the following: centroid, curve fitting, skin-color detection, object recognition, facial recognition, sensor tilt, and bounding dimensions of the head)]; automatically determining, by the processor of the computing device, one or more body measurements (i) from the one or more determined spatial measurements and/or (ii) directly from two or more images of the sequence of images (e.g., where the behavior to be detected is a fall of the individual, the one or more body measurements may comprise a descent of a position corresponding to the individual's head (i) over a short period of time and/or (ii) down to a low position in the field of view, e.g., below normal seated or reclining level on furniture, i.e., where it would be unusual for a human head to be unless the individual had fallen); automatically detecting, by the processor of the computing device, a behavior of the individual (e.g., a fall, a presence or absence in a room, walking, sitting, standing, room transit, a direction of movement, an activity level, and/or eating) from the one or more determined body measurements and/or the one or more determined spatial measurements; and automatically initiating, by the processor of the computing device, an event upon detection of the behavior of the individual [e.g., display of an identification of the detected behavior on a screen of a computing device, or transmission of an alert corresponding to the detected behavior (e.g., a fall alert) e.g., via email, telephone, internet, website, text message, instant message, video message, and/or wireless transmission, to a computing device].

In certain embodiments, the method comprises determining, by the processor of the computing device, a change (e.g., a rate of change) of one or more of the spatial measurements and/or one or more of the body measurements. In certain embodiments, the method comprises storing a predetermined number of images of the sequence of images (e.g., obtained over a predetermined period of time) and purging (e.g., erasing, deleting, removing from computer memory) other images (e.g., images having aged beyond the predetermined period of time, e.g., wherein the predetermined period of time is chosen to allow retention of images obtained over a certain monitoring period for purposes of verification and/or further investigation of a detected behavior, e.g., a fall, while addressing security/privacy concerns and/or video storage concerns by deleting any stale images/video, e.g., wherein the period of time is, for example, 1 day, 1 hour, 30 minutes, 15 minutes, 10 minutes, 5 minutes, 2 minutes, or a shorter or longer period).

In certain embodiments, the method comprises storing a sequence of images corresponding to one or more particular detected behaviors at issue (e.g., a fall), and purging (e.g., erasing, deleting, removing from computer memory, or otherwise not storing) images that do not correspond to the one or more particular detected behaviors.

In certain embodiments, the method comprises transmitting, from the mobile electronic device, at least a portion of the sequence of images to an external system or recipient (e.g., wherein such transmission is automated and/or may be cancelled by a user).

In certain embodiments, the method comprises displaying graphics on a screen of the mobile electronic device while the sequence of images is being captured (e.g., wherein the graphics are different from the sequence of images being captured, e.g., for unobtrusive monitoring, or wherein the graphics comprise the sequence of images being captured, e.g., to show that only silhouette data is being recorded and stored, e.g., temporarily stored).

In another aspect, the invention is directed to a system comprising: a processor; and a memory having instructions stored thereon, wherein the instructions, when executed by the processor, cause the processor to: (a) identify graphical elements of a sequence of images obtained with a mobile electronic device corresponding to an individual moving within a field of view of the mobile electronic device (e.g., identify a movement mask corresponding to the individual, e.g., which may subsume the optional pre-processing step, e.g., wherein the movement mask is an estimation, from the sequence of images, of a portion or entirety of a silhouette of a moving individual within the field of view); (b) determine one or more spatial measurements from one or more images of the sequence of images (e.g., following pre-processing and/or following removal of all non-moving and/or non-human elements) [e.g., wherein the one or more spatial measurements comprises at least one member selected from the group consisting of: (i) a topmost pixel row (e.g., the topmost row of an image corresponding to a segmented human figure, determined for at least one of the images from the sequence of images, e.g., two or more of the images, for example, to detect a change in head level of the individual); (ii) a row-width maximum (e.g., in an image in which topmost pixel row is determined and presumed to correspond to the top of a human head in the field of view, determine a subsequent row where width between first and last pixels corresponding to the head ceases to increase, thereby determining a middle portion of the head); (iii) a row-width minimum (e.g., in an image in which topmost pixel row is determined and presumed to correspond to the top of a human head in the field of view, determine a subsequent row where width between first and last pixels corresponds to a minimum, thereby determining the neck of the individual); (iv) a corner brightness (e.g., to detect and compensate for initiation of an 'automatic gain' correction being made by the mobile electronic device acquiring the sequence of images, e.g., when the individual moves nearer to the mobile electronic device); (v) an overall brightness of an image excluding the movement mask (e.g., to detect and compensate for initiation of an 'automatic gain' correction being made by the mobile electronic device acquiring the sequence of images, e.g., when the individual moves nearer to the mobile electronic device); and (vi) a mask proportion or size (e.g., ratio of pixels of the movement mask to the total pixels in the field of view, e.g., to determine when the individual has moved too close to the mobile electronic device acquiring the sequence of images to provide accurate results, e.g., thereby reducing false positives when the behavior to be detected is a fall) (e.g., and, optionally, any one or more of the following: centroid, curve fitting, skin-color detection, object recognition, facial recognition, sensor tilt, and bounding dimensions of the head)]; (c) determine one or more body measurements (i) from the one or more determined spatial measurements and/or (ii) directly from two or more images of the sequence of images (e.g., where the behavior to be detected is a fall of the individual, the one or more body measurements may comprise a descent of a position corresponding to the individual's head (i) over a short period of time and/or (ii) down to a low position in the field of view, e.g., below normal seated or reclining level on furniture, i.e., where it would be unusual for a human head to be unless the individual had fallen); (d) detect a behavior of the individual (e.g., a fall, a presence or absence in a room, walking, sitting, standing, room transit, a direction of movement, an activity level, and/or eating) from the one or more determined body measurements and/or the one or more determined spatial measurements; and (e) initiate an event upon detection of the behavior of the individual [e.g., display of an identification of the detected behavior on a screen of a computing device, or transmission of an alert corresponding to the detected behavior (e.g., a fall alert) e.g., via email, telephone, internet, website, text message, instant message, video message, and/or wireless transmission, to a computing device].

In certain embodiments, the system further comprises the mobile electronic device. In certain embodiments, the instructions, when executed by the processor, cause the processor to determine a change (e.g., a rate of change) of one or more of the spatial measurements and/or one or more of the body measurements. In certain embodiments, the instructions, when executed by the processor, cause the processor to store a predetermined number of images of the sequence of images (e.g., obtained over a predetermined period of time) and purge (e.g., erase, delete, or remove from computer memory) other images (e.g., images having aged beyond the predetermined period of time, e.g., wherein the predetermined period of time is chosen to allow retention of images obtained over a certain monitoring period for purposes of verification and/or further investigation of a detected behavior, e.g., a fall, while addressing security/privacy concerns and/or video storage concerns by deleting any stale images/video, e.g., wherein the period of time is, for example, 1 day, 1 hour, 30 minutes, 15 minutes, 10 minutes, 5 minutes, 2 minutes, 1 minute, 30 seconds, 5 seconds, or a shorter or longer period).

In certain embodiments, the instructions, when executed by the processor, cause the processor to store a sequence of images corresponding to one or more particular detected behaviors at issue (e.g., a fall), and purging (e.g., erasing, deleting, removing from computer memory, or otherwise not storing) images that do not correspond to the one or more particular detected behaviors.

In certain embodiments, the instructions, when executed by the processor, cause the processor to transmit, from the mobile electronic device, at least a portion of the sequence of images to an external system or recipient (e.g., wherein such transmission is automated and/or may be cancelled by a user). In certain embodiments, the instructions, when executed by the processor, cause the processor to display graphics on a screen of the mobile electronic device while the sequence of images is being captured (e.g., wherein the graphics are different from the sequence of images being captured, e.g., for unobtrusive monitoring, or wherein the graphics comprise the sequence of images being captured, e.g., to show that only silhouette data is being recorded and stored, e.g., temporarily stored).

In another aspect, the invention is directed to a method for automatically detecting a behavior of an individual (e.g., a fall, a presence or absence in a room, walking, sitting, standing, room transit, a direction of movement, an activity level, and/or eating), the method comprising: optionally, pre-processing a captured sequence of images by a processor of a computing device prior to subsequent image processing (e.g., to reduce or eliminate noise, and/or to 'subtract' undesired background and/or non-human elements from the sequence of images, e.g., applying grayscale, threshold, bitwise logical operations {e.g., AND operations, OR operations}, dilation, and/or erosion, e.g., to segment a human figure from background) (e.g., performing cascading subtractions between multiple pairs of images obtained at different times to remove undesired background items while preserving both moving and non-moving portions of a desired human figure), wherein the captured sequence of images comprises a sequence of images (e.g., a video stream) of a space at least occasionally inhabited by the individual, the sequence of images having been (or being) captured with a mobile electronic device (e.g., personal computing device with image capture functionality) positioned (e.g., within the space) at a height within a predetermined range of acceptable vertical heights (e.g., at a height from waist level of the individual to head level of the individual, e.g., top of head) and at an angular orientation within a predetermined range of acceptable angular orientations (e.g., from −30° to 30° with respect to horizontal, or from −20° to 20° with respect to horizontal, or from −15° to 15° with respect to horizontal, or from −10° to 10° with respect to horizontal) (e.g., wherein the sequence of images are obfuscated to eliminate detail, thereby providing privacy, e.g. the images are obfuscated via a filter, film, screen, gel, and/or an image-distorting lens, and/or the images are obfuscated digitally following image capture by a processor of a computing device); automatically identifying, by the processor of the computing device, graphical elements of the sequence of images (e.g., following the pre-processing step) corresponding to the individual moving within a field of view of the mobile electronic device (e.g., wherein the individual is moving at least at some point in time during which the sequence of images are obtained, not necessarily continually) (e.g., identifying a movement mask corresponding to the individual, e.g., which may subsume the optional pre-processing step, e.g., wherein the movement mask is an estimation, from the sequence of images, of a portion or entirety of a silhouette of a moving individual within the field of view); automatically determining, by the processor of the computing device [e.g., wherein "processor of the computing device" is a processor of the mobile computing device, a processor of a server (e.g., where the images are processed remotely), a processor of a home computer, or any combination of these], one or more spatial measurements from one or more images of the sequence of images (e.g., following pre-processing and/or following removal of all non-moving and/or non-human elements) [e.g., wherein the one or more spatial measurements comprises at least one member selected from the group consisting of: (i) a topmost pixel row (e.g., the row of an image corresponding to a segmented human figure, determined for at least one of the images from the sequence of images, e.g., two or more of the images, for example, to detect a change in head level of the individual); (ii) a row-width maximum (e.g., in an image in which topmost pixel row is determined and presumed to correspond to the top of a human head in the field of view, determine a subsequent row where width between first and last pixels corresponding to the head ceases to increase, thereby determining a middle portion of the head); (iii) a row-width minimum (e.g., in an image in which topmost pixel row is determined and presumed to correspond to the top of a human head in the field of view, determine a subsequent row where width between first and last pixels corresponds to a minimum, thereby determining the neck of the individual); (iv) a corner brightness (e.g., to detect and compensate for initiation of an 'automatic gain' correction being made by the mobile electronic device acquiring the sequence of images, e.g., when the individual moves nearer to the mobile electronic device); (v) an overall brightness of an image excluding the movement mask (e.g., to detect and compensate for initiation of an 'automatic gain' correction being made by the mobile electronic device acquiring the sequence of images, e.g., when the individual moves nearer to the mobile electronic device); and (vi) a mask proportion or size (e.g., ratio of pixels of the movement mask to the total pixels in the field of view, e.g., to determine when the individual has moved too close to the mobile electronic device acquiring the sequence of images to provide accurate results, e.g., thereby reducing false positives when the behavior to be detected is a fall) (e.g., and, optionally, any one or more of the following: centroid, curve fitting, skin-color detection, object recognition, facial recognition, sensor tilt, and bounding dimensions of the head); automatically determining, by the processor of the computing device, one or more body measurements (i) from the one or more determined spatial measurements and/or (ii) directly from two or more images of the sequence of images (e.g., where the behavior to be detected is a fall of the individual, the one or more body measurements may comprise a descent of a position corresponding to the individual's head (i) over a short period of time and/or (ii) down to a low position in the field of view, e.g., below normal seated or reclining level on furniture, i.e., where it would be unusual for a human head to be unless the individual had fallen)]; automatically detecting, by the processor of the computing device, a behavior of the individual (e.g., a fall, a presence or absence in a room, walking, sitting, standing, room transit, a direction of movement, an activity level, and/or eating) from the one or more determined body measurements and/or the one or more determined spatial measurements; and automatically initiating, by the processor of the computing device, an event upon detection of the behavior of the individual [e.g., display of an identification of the detected behavior on a screen of a computing device, or transmission of an alert corresponding to the detected behavior (e.g., a fall alert) e.g., via email, telephone, internet, website, text message, instant message, video message, and/or wireless transmission, to a computing device].

In another aspect, the invention is directed to a non-transitory computer readable medium having instructions stored thereon, wherein the instructions, when executed by a processor, cause the processor to: (a) identify graphical elements of a sequence of images obtained with a mobile electronic device corresponding to an individual moving within a field of view of the mobile electronic device (e.g., identify a movement mask corresponding to the individual, e.g., which may subsume the optional pre-processing step, e.g., wherein the movement mask is an estimation, from the sequence of images, of a portion or entirety of a silhouette of a moving individual within the field of view); (b) determine one or more spatial measurements from one or more images of the sequence of images (e.g., following pre-processing and/or following removal of all non-moving and/or non-human elements) [e.g., wherein the one or more spatial measurements comprises at least one member selected from the group consisting of: (i) a topmost pixel row (e.g., the topmost row of an image corresponding to a segmented human figure, determined for at least one of the images from the sequence of images, e.g., two or more of the images, for example, to detect a change in head level of the individual); (ii) a row-width maximum (e.g., in an image in which topmost pixel row is determined and presumed to correspond to the top of a human head in the field of view, determine a subsequent row where width between first and last pixels corresponding to the head ceases to increase, thereby determining a middle portion of the head); (iii) a row-width minimum (e.g., in an image in which topmost pixel row is determined and presumed to correspond to the top of a human head in the field of view, determine a subsequent row where width between first and last pixels corresponds to a minimum, thereby determining the neck of the individual); (iv) a corner brightness (e.g., to detect and compensate for initiation of an 'automatic gain' correction being made by the mobile electronic device acquiring the sequence of images, e.g., when the individual moves nearer to the mobile electronic device); (v) an overall brightness of an image excluding the movement mask (e.g., to detect and compensate for initiation of an 'automatic gain' correction being made by the mobile electronic device acquiring the sequence of images, e.g., when the individual moves nearer to the mobile electronic device); and (vi) a mask proportion or size (e.g., ratio of pixels of the movement mask to the total pixels in the field of view, e.g., to determine when the individual has moved too close to the mobile electronic device acquiring the sequence of images to provide accurate results, e.g., thereby reducing false positives when the behavior to be detected is a fall) (e.g., and, optionally, any one or more of the following: centroid, curve fitting, skin-color detection, object recognition, facial recognition, sensor tilt, and bounding dimensions of the head)]; (c) determine one or more body measurements (i) from the one or more determined spatial measurements and/or (ii) directly from two or more images of the sequence of images (e.g., where the behavior to be detected is a fall of the individual, the one or more body measurements may comprise a descent of a position corresponding to the individual's head (i) over a short period of time and/or (ii) down to a low position in the field of view, e.g., below normal seated or reclining level on furniture, i.e., where it would be unusual for a human head to be unless the individual had fallen); (d) detect a behavior of the individual (e.g., a fall, a presence or absence in a room, walking, sitting, standing, room transit, a direction of movement, an activity level, and/or eating) from the one or more determined body measurements and/or the one or more determined spatial measurements; and (e) initiate an event upon detection of the behavior of the individual [e.g., display of an identification of the detected behavior on a screen of a computing device, or transmission of an alert corresponding to the detected behavior (e.g., a fall alert) e.g., via email, telephone, internet, website, text message, instant message, video message, and/or wireless transmission, to a computing device].

In certain embodiments of any of the methods or systems described herein, the sequence of images is captured by a single camera and/or a single mobile electronic device.

In another aspect, the invention is directed to a method of detecting that an individual has fallen down (or detecting another behavior), while protecting the individual's privacy, the method comprising: capturing image data corresponding to one energy sensor, the energy sensor configured to capture energy reflected from the individual and the objects within the field-of-view; identifying elements of the image data that correspond to an individual moving within the field-of-view; generating body measurements for the moving individual based on the captured data from the energy sensor; identifying temporal changes in the body measurements that indicate that a fall (or other behavior) may have occurred; and sending a fall alert (or indication of another behavior) to an operator, system, or third party.

In certain embodiments, an energy emitter emits energy to reflect off objects and an individual within the field-of-view. In certain embodiments, the energy sensor acquires at least one of reflected infrared light, reflected laser light, reflected ultraviolet light, reflected visible light, reflected X-rays, reflected microwaves, reflected radio waves, reflected sound waves, reflected ultrasound energy, and reflected thermal energy. In certain embodiments, the energy emitter emits at least one of a pattern of infrared light, a pattern of laser light, a pattern of ultraviolet light, a pattern of visible light, a pattern of X-rays, a pattern of microwaves, a pattern of radio waves, a pattern of sound waves, a pattern of ultrasound energy, and a pattern of thermal energy.

In certain embodiments, a lens modifies the distance or angular range of the field-of-view. In certain embodiments, the lens is a fisheye or a wide-angle lens. In certain embodiments, an obfuscator blurs or distorts the images received or sent by the energy sensor. In certain embodiments, the obfuscator is a physical film, screen, filter, or gel. In certain embodiments, the obfuscator is a software algorithm.

In certain embodiments, a storage module temporary stores a predetermined number of images that have been received by the energy sensor. In certain embodiments, the images contained within the storage module are transmitted upon request to an external system or recipient. In certain embodiments, the individual within the field-of-view may prevent or cancel the transmission of images.

In certain embodiments, a movement mask is generated that estimates a portion or an entirety of the silhouette of the moving individual. In certain embodiments, the body measurements for the moving individual are generated from information about the movement mask. In certain embodiments, the body measurements include at least one of: a topmost pixel row; one or more row-width maxima or minima; a mask proportion or size; a centroid; a curve fitting; a skin-color detection; an object recognition; and a facial recognition. In certain embodiments, the head-height and/or head-width of the individual's head are determined from the body measurements. In certain embodiments, a fall event is detected by evaluating sequential values of one or more body measurements. In certain embodiments, a fall event is detected by evaluating sequential values of a topmost pixel row or a centroid. In certain embodiments, a fall event is detected by evaluating sequential positions of the head bounding box. In certain embodiments, one or more of the following events are detected by evaluating sequential values of the body measurements: falling down; presence or absence; sitting or standing; room transit; direction of movement; activity level; or dining. In certain embodiments, an alert is triggered when an event is detected. In certain embodiments, the alert is in the form of at least one of the following: an electronic message; an email; a phone call; a text message; an instant message; a video message.

In certain embodiments, the body measurements are adjusted in accordance with the vertical tilt of the energy sensor. In certain embodiments, the real-world spatial distances of the body measurements are estimated by using the individual's head as a calibration reference. In certain embodiments, the images are discarded substantially immediately after their corresponding body measurements are generated, in order to preserve the individual's privacy. In certain embodiments, the energy sensor's power status and/or angle of tilt and/or geographic location (e.g., via GPS) are periodically reported, and an alert is triggered if any one of these indicators changes value, or ceases to be reported.

In certain embodiments, a screen displays information to the individual. In certain embodiments, the displayed information includes at least one of: power status; angle of tilt; geographic location; the types and/or values of body measurements being acquired; weather; news; photos or videos (e.g., uploaded by the individual's family); alert of an event, such as a fall event; and an option (e.g., a touchscreen button) by which to cancel an alert, such as a fall alert. In certain embodiments, the screen is a touchscreen, by which the individual may configure or control the system, or cancel an alert.

Details described with respect to one aspect of the invention may be applied, in certain embodiments, with respect to another aspect of the invention. For example, details described with respect to a method of the invention may also be applied, in certain embodiments, with respect to a system of the invention.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIGS. 1A-1D show block diagrams according to specific embodiments of the present system and method.

FIGS. 2A and 2B show high-level flowcharts according to specific embodiments of the present system and method.

FIG. 3 shows examples and accompanying characteristics of pre-processing operations that may be carried out on images.

FIGS. 5A-5F show an improved example of creating a "movement mask".

FIGS. 5G-5L show an improved example of creating a "movement mask".

FIG. 6 shows examples of spatial measurements that may be calculated from images and/or movement masks.

FIG. 10 shows a flowchart to calculate a "movement mask" according to a specific embodiment of the present system and method.

FIG. 12 displays examples of body measurements that may be determined by embodiments of the present system and method.

FIG. 13 shows a flowchart to detect a fall event from a sequence of images according to a specific embodiment of the present system and method.

FIG. 14 shows a flowchart to enable an end-user to cancel a fall event alert according to a specific embodiment of the present system and method.

FIG. 16 shows examples of potential sources of false signals, and examples of how they may be countered.

DETAILED DESCRIPTION

Figure 1B:
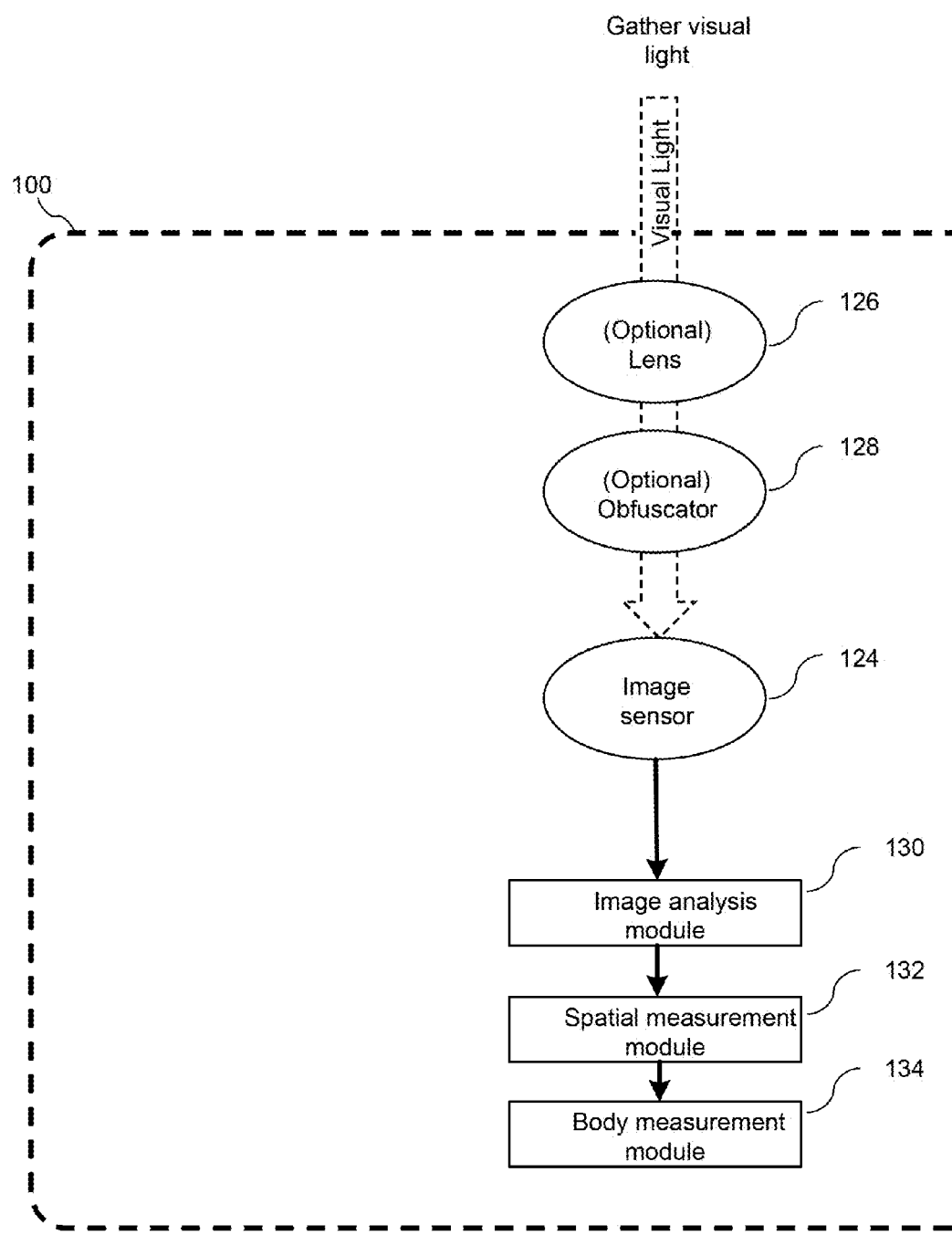

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

This invention relates to the automated use of energy sensors (e.g., a camera for capturing a sequence of images) to detect human falls while preserving privacy.

As used herein, "automated" means automatic or semi-automatic execution, such that ongoing involvement by a human operator is not required.

As used herein, "energy sensors" refers to sensors that gather two-dimensional data about a field-of-view, such as video cameras, phone cameras, tablet cameras, webcams, or infrared cameras.

As used herein, "fall detection" refers to the identification that a person has fallen, toppled, slumped, or otherwise involuntarily failed to maintain a purposeful standing or sitting posture.

As used herein, "privacy" refers to preventing the acquisition and/or dissemination of embarrassing or undignified images or photos.

As used herein, an "image" includes any visual representation, such as a photo, a video frame, streaming video, as well as any electronic, digital or mathematical analogue of a photo, video frame, or streaming video. The image may result from detected visible light, or from any other detected electromagnetic radiation (e.g., infrared, ultraviolet, or other).

Specifically, some embodiments of the present invention are designed to detect falls in the following environments: (i) deployed into the domicile of a single end-user who often lives alone; (ii) physically placed within a predetermined range of vertical heights and angular orientations; (iii) physically placed so as not to face any televisions or windows; (iv) functional even in the presence of a privacy-preserving physical obfuscator, such as a glass film, that blurs or distorts incoming images; (v) functional whether or not the user is facing toward the present invention (i.e., continues to work if only the back of the head is apparent); (vi) does not require storage of images or video for more than brief periods of time (e.g., fractions of a second); and/or (vii) does not require transmission of images and/or video to third parties, or outside the end-user's home.

In certain embodiments, the system comprises: (i) a sensor for image acquisition, e.g., a webcam, or phone camera, or tablet camera of a mobile computing device; (ii) computational power to locally analyze the images thus received, and generate measurements or other signals (e.g., can be a processor of a mobile computing device); (iii) transmission capabilities, such as wireless connectivity, to transmit measurements or other signals to external devices or parties; (iv) an optional screen or touchscreen for user input and/or feedback; (v) an optional lens, such as a wide-angle lens, for greater distance or angular range; (vi) an optional image obfuscator, such as a glass film, for greater protection of privacy; and/or (vii) an optional stand or holder, for device positioning and for protection against theft or accidental misconfiguration.

In certain embodiments, the system/method may utilize readily-available and/or commoditized hardware, such as tablets (e.g., Android, iPad), smart phones, or hobbyist computers (e.g., Raspberry Pi, Arduino), thus keeping cost and size to a minimum. This device is preferably easy to position and/or reposition within a household. For example, it may be positioned in a room (or multiple devices may be placed in multiple rooms) in which the individual to be monitored is likely to be for most of the day. Because of the familiarity of the public with such devices, they are unobtrusive, and their purpose as monitoring devices are not obvious to a casual observer, such as a house guest. The system may robustly detect falls, optimized for the constrained set of real-world conditions for which it is designed. The system may be executed on low-end, affordable computational hardware. In certain embodiments, the system protects user privacy by obfuscating incoming images and/or by not storing, not transmitting, or erasing-after-temporarily-storing images; thus, the system is suitable for placement in a bedroom, bathroom, or any other location in a home. In certain embodiments, the system transmits to one or more third parties, either delayed or in real-time, one or more types of measurements of user activity and/or status, for example, fall detection. The system does not require individuals to wear a sensor or other device, nor is any special clothing required. The individual being monitored does not need to face in a particular direction or assume a particular posture. The system is easy to install and operate in an individual's own home. The system does not require special training or skill to operate. The system is passive rather than active, and it does not require the user to remember to perform particular actions or to engage in particular activities. The system enables real-time interactivity with the user, for example, it may display useful information to the user.

In some embodiments, the system features a small, affordable sensor that can be placed within an individual's home that allows friends, family, or other caregivers to monitor selected aspects of the individual's physical behavior on a real-time basis. Examples of such behaviors include walking, sitting, standing, eating, as well as falling. The system, thus, fulfills a dual role of reassuring caregivers when all is well, and alerting them when something may be amiss.

In some embodiments, the sensor is placed in care settings where patients are treated more intensively but are still ambulatory, such as hospital wards, assisted-living facilities, or nursing homes. In these cases, such embodiments can provide early warning to on-site providers or care managers, thus reducing the need for round-the-clock human monitoring.

Specifically, in some embodiments, the method described herein includes:
a) Positioning an image-capture device within a predetermined range of vertical heights and angular orientations, and optionally subject to other predetermined criteria, e.g., that no television or windows are within its field-of-view;
b) Optionally extending the distance and/or angular range of the image-capture device, for example, by use of a wide-angle or fisheye lens;
c) Optionally obfuscating incoming images to the image-capture device, for example, by use of an external image-distorting lens or film;
d) Acquiring a series of images with the image-capture device, corresponding to a field-of-view during a period of time;
e) Extracting a set of predetermined features from the series of images;
f) Discarding the images (e.g., immediately after extraction of features, after a predetermined period of time, or never saving the images);
g) Analyzing the set of predetermined features for spatial or temporal signals that may indicate an event of interest, such as a fall or another predetermined activity; and
h) Transmitting the signals to the user and/or to a third party; where said signals are designed to preclude the possibility of reconstruction or reverse-engineering of the original acquired images;
i) Repeating steps (d) to (h), e.g., on a real-time basis.

Embodiments described herein are designed to automate taking measurements of a user's movement and behavior in ways that are compact, portable, private, affordable, repeatable, rapid, and convenient. Some embodiments of the system may utilize a single energy sensor, e.g., a standard color-image camera such as those found on most modern phones and tablets. Some embodiments of the system may utilize a single energy emitter, e.g., an infrared emitter, and a single energy sensor, e.g., an infrared detector.

FIG. 1A shows a block diagram of an embodiment of the present method and system. A system for video-based fall detection with privacy is shown generally as 100, which may be used to carry out the method disclosed described in this document. As set forth above, any form of active energy capture (emission of energy and capture of the reflected energy) and/or passive energy capture (capture of reflected energy based on ambient energy sources) may be used.

As shown in FIG. 1A, energy emitter 102 bathes the field-of-view with energy. As described previously, the energy emitted may comprise visible light, or non-visible light, or sound, or any other type of energy. The energy emitted may bathe the entire field-of-view all at once, or may bathe different parts of the field-in-view in turn. Energy sensor 104 gathers the energy that is reflected or received from objects in the field-of-view.

Lens 106 may be placed between energy sensor 104 and the field-of-view, in order to change the distance and/or angular range of energy received. For example, lens 106 may be a fisheye lens that increases the angle-of-view of energy sensor 104 to (for example) 180 degrees. Lens 106 may comprise a single lens, or a combination of multiple lenses. In addition, energy sensor 104 may contain its own (separate) built-in lens or lenses (not shown in FIG. 1A).

Obfuscator 108 may be placed between energy sensor 104 and the field-of-view, in order to blur, distort, or otherwise modify the incoming energy data so as to protect the privacy of an end-user. Obfuscator 108 may comprise one or more physical components (e.g., a glass film), or one or more software components (e.g., a blurring algorithm), or either one individually, or any combination thereof. Obfuscator 108 may take the form of a film, screen, filter, or any other algorithm or device that modifies the incoming energy data so as to protect the privacy of an end-user. For example, 3M Corporation (St. Paul, Minn.) manufactures Fasara-brand decorative window films, which are glass finishes designed to tailor the luminance, color, or precision of light that passes through the window. For example, Rosco Laboratories (Stamford, Conn.) manufactures a variety of color-light filters that are based on gels or other diffusion materials. Obfuscator 108 may comprise a single obfuscator, or a combination of multiple obfuscators (for example, two overlaid glass films). In addition, energy sensor 104 may contain its own (separate) built-in obfuscator or obfuscators (not shown in FIG. 1A).

The ordering of lens 106 and obfuscator 108 may be swapped, so that either one may be placed closer in sequence to energy sensor 104. Furthermore, multiple lenses 106 and obfuscators 108 may be interleaved, in any combination or order desired, between the field-of-view and energy sensor 104. Furthermore, other lenses 106 and obfuscators 108 may be placed between energy sensor 104 and energy analysis module 110 or temporary storage module 116 (not shown in FIG. 1A). For example, the energy pattern recorded by energy sensor 104 may be blurred or distorted by software (not shown in FIG. 1A), before being sent to energy analysis module 110 or temporary storage module 116.

Energy analysis module 110 performs pre-processing analysis on the energy pattern received by energy sensor 104. Examples of such pre-processing analysis are shown in FIG. 3, and include, for example, procedures to minimize noise; to remove extraneous or unwanted information; or to otherwise pre-process the incoming energy patterns in preparation for spatial measurement module 112.

Spatial measurement module 112 calculates spatial measurements on the output of energy sensor 104. As used herein, a "spatial measurement" is a calculation that applies to a single data-snapshot. As used herein, a "data-snapshot" is a single collection of data from energy sensor 104. For example, if energy sensor 104 is a standard mobile-phone camera, then a "data-snapshot" for energy sensor 104 corresponds to a single image received from the mobile-phone camera, and a "spatial measurement" is a calculation of any feature-of-interest that may be acquired from the single image. Examples of such spatial measurements are shown in FIG. 6, and include, for example, the topmost pixel-row of a collection of pixels; the centroid of a collection of pixels; or the widths of contiguous rows of pixels.

Body measurement module 114 calculates body measurements on the output of spatial measurement module 112. As used herein, a "body measurement" is a calculation of the movement of a human body within the field-of-view. The body measurement may be absolute (e.g., in centimeters per second), or relative (e.g., faster or slower than some other body movement, which in turn may be past or present). The body measurement may apply to the entire body of a person (e.g., walking speed), or to just a portion of the body (e.g., head height). The body measurement may be calculated from just a single data-snapshot received from energy sensor 104, or from multiple data-snapshots. The body measurement may be substantially instantaneous (e.g., the head height as of "right now"), or may apply to a period of time (e.g., the change in head height over the past second of time). Examples of such body measurements are shown in FIG. 12, and include, for example, relative change in head height; direction of walking; and walking speed.

Optional storage module 116 stores a plurality of data-snapshots from energy sensor 104. The primary purpose of storage module 116 is to enable confirmation (immediate) or forensics (in the past) when a fall event or other potential emergency occurs, while preserving the privacy of an end-user. For example, if energy sensor 104 is a standard mobile-phone camera, then storage module 116 may be used to store only the previous (for example) five minutes of images from energy sensor 104, and provide those images to a third party, such as a clinician or emergency-services supplier, when a fall event is detected. The third party may then confirm that a fall has occurred, or ascertain the cause of the fall, while having access to minimal video information. A further optional use of temporary storage module 116 is to enable a video stream while embodiments of the present invention are placed or otherwise set up, for example, in an end-user's home, in order to aid the end-user in optimal setup. A possible operation of temporary storage module 116 is shown further in FIG. 15.

System 100 encapsulates a minimal set of components required by some embodiments of the present inventive method, viz., an energy emitter, an energy sensor, and modules to carry out body measurements. System 100 is a label of convenience, roughly corresponding to the typical hardware and software components required for some real-world embodiments of the present inventive method. In some embodiments, energy analysis module 110; spatial measurement module 112; and body measurement module 114, may be placed in different orders, combined together, or split into further sub-modules. In some embodiments, system 100 may correspond to a single tablet computer, such as the Galaxy Tab (Samsung, Seoul, Korea) or the iPad (Apple, Cupertino, Calif.), containing a hardware camera and software to carry out the computations of the modules in system 100.

FIG. 1B shows another embodiment of the present inventive method. FIG. 1B is similar to FIG. 1A, except that optional energy emitter 102 and optional temporary storage module 116 are omitted, to emphasize that they are not required for some embodiments; and that energy sensor 104 is replaced with image sensor 124 and energy analysis module 110 is replaced with image analysis module 130, to emphasize that some embodiments may use a single visual-light camera, such as those found on modern mobile phones and tablets. All items in FIG. 1B correspond to their like-numbered items in FIG. 1A.

Figure 1C:
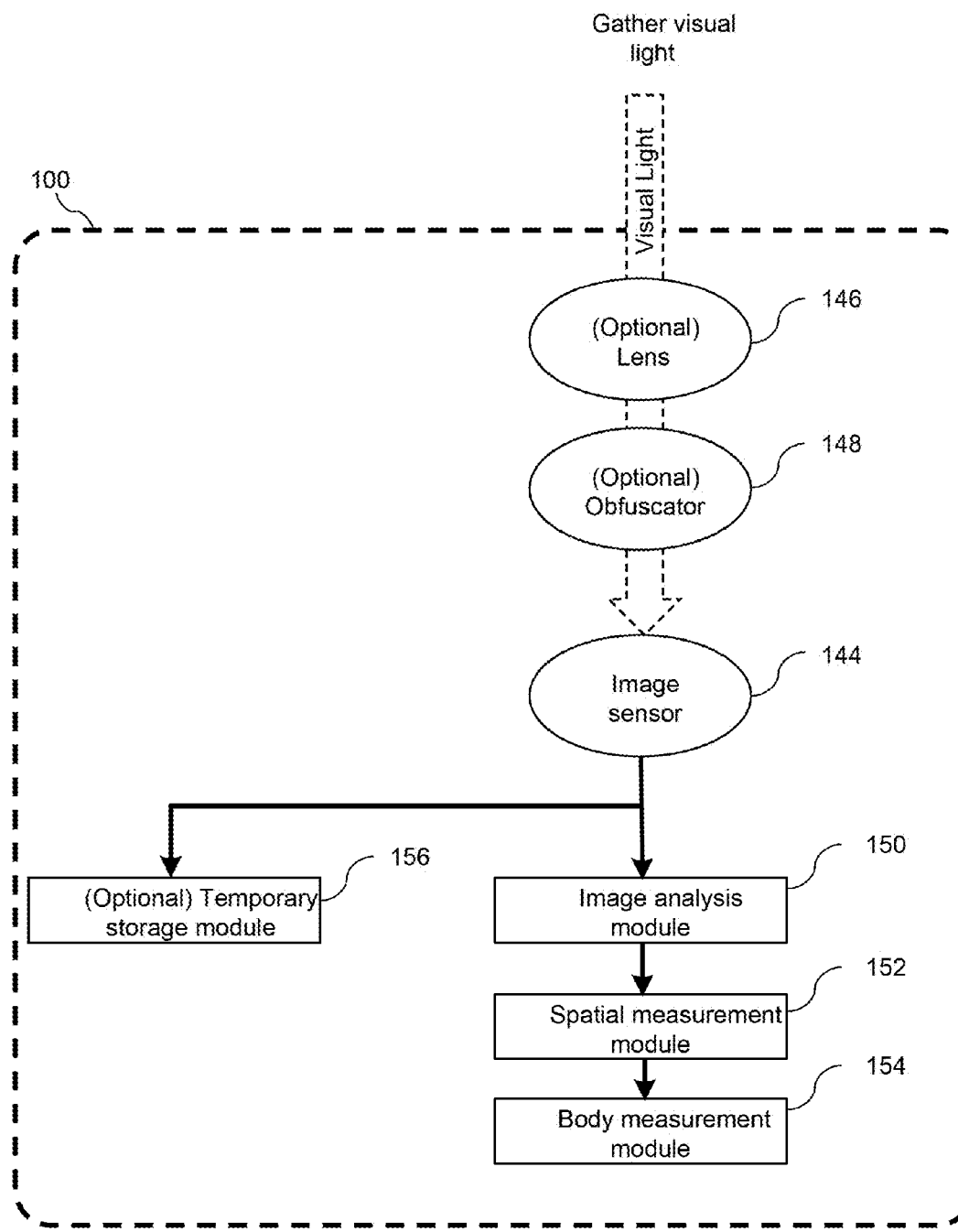

FIG. 1C shows another embodiment of the present inventive method. FIG. 1C is similar to FIG. 1B, except that temporary storage module 156 is included, to emphasize that in some embodiments a circumscribed collection of images may be stored for confirmation or for forensics when a particular event is detected. In some embodiments, temporary storage module 156 is substantially co-located with the other items in system 100 (as opposed to being located elsewhere, e.g., not transmitted to a separate computer server), in order to keep the contents of temporary storage module 156 private and secure. All items in FIG. 1C correspond to their like-numbered items in FIG. 1B.

Figure 1D:
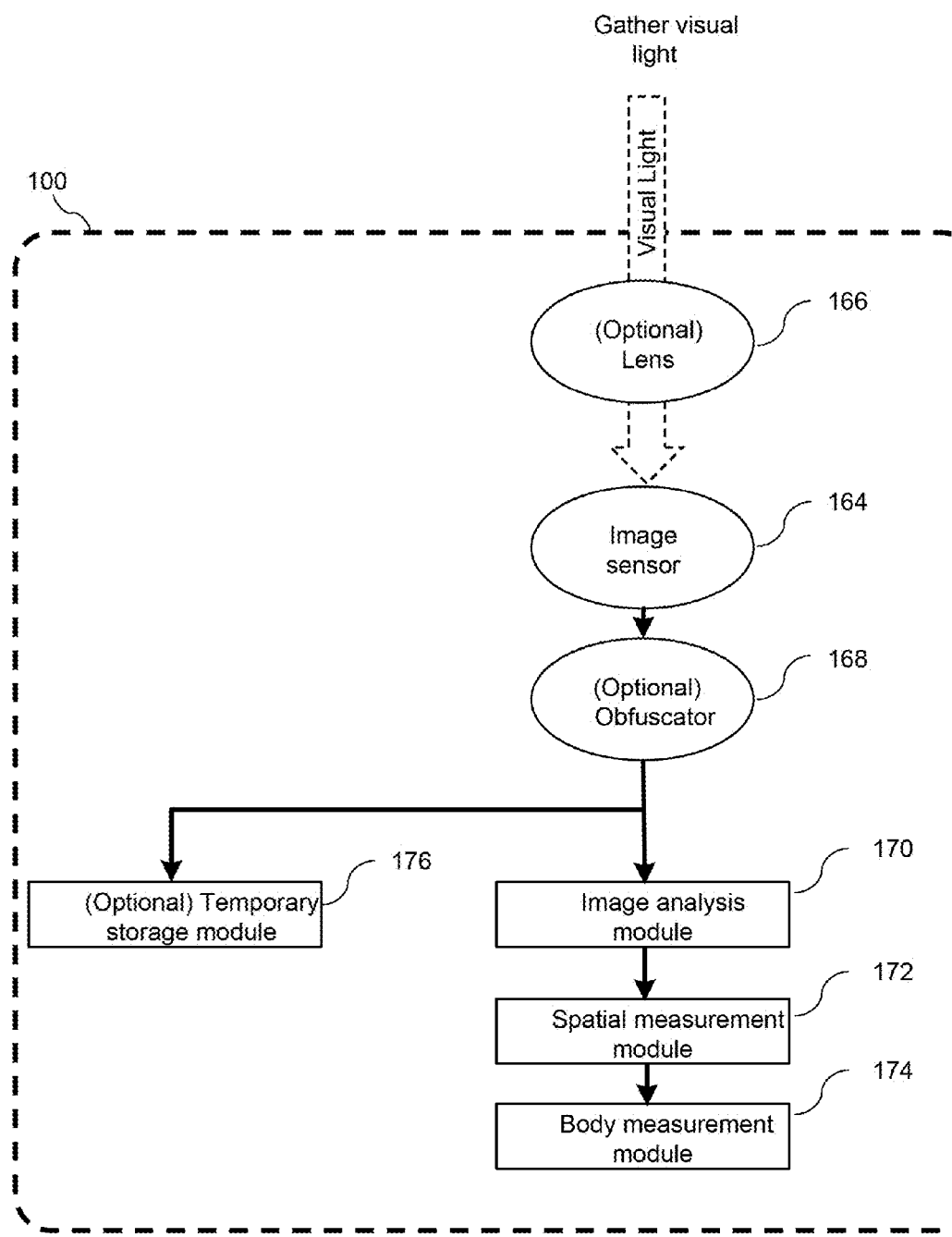

FIG. 1D shows another embodiment of the present inventive method. FIG. 1D is similar to FIG. 1C, except that the ordering of obfuscator 168 and image sensor 164 have been switched, to emphasize that different embodiments of the present inventive method may have different orderings of these items. As noted above, obfuscator 168 may comprise physical components (e.g., a glass film), or software components (e.g., a blurring algorithm), or any combination. Furthermore, as described above, lens 166 may also be re-ordered with respect to image sensor 164 and obfuscator 168 (not shown in FIG. 1D). All items in FIG. 1D correspond to their like-numbered items in FIG. 1C.

FIG. 2A shows a high-level flowchart describing a preferred embodiment of the present system and method, beginning at step 200. In step 205, an energy-emitter and an energy-sensor are positioned according to a set of predetermined criteria. For example, the two items may be positioned substantially co-located, at a height between 1 and 2 meters, within the home of an end-user, facing the interior of the room. In some embodiments, these items correspond to energy-emitter 102 and energy-sensor 104 and their like-numbered items of FIG. 1A-1D.

In step 210, an optional lens—for example, a fisheye lens—is positioned in front of the energy-sensor of step 205, in order to extend distance and/or angular range into the field-of-view. In some embodiments, this lens corresponds to lens 106 and its like-numbered items of FIG. 1A-1D.

In step 215, an optional obfuscator—for example, a frosted-pattern glass film—is positioned in front of the energy-sensor of step 205, in order to protect user privacy. In some embodiments, this obfuscator corresponds to obfuscator 108 and its like-numbered items of FIG. 1A-1D.

In step 220, a series of data-snapshots are acquired from the energy-sensor of step 205. The series may comprise one, or more than one, data-snapshots. At any given moment in time, zero, one, or more than one data-snapshot may be kept temporarily retained in order to conduct the steps of FIG. 2A. In general, it is preferred to keep the number of retained data-snapshots small, so as to better safeguard user privacy. FIG. 10 shows a further example of analyzing images wherein only 3 data-snapshots are retained at any given moment in time; however, in general, any number of data-snapshots may be retained.

In step 225, analysis is performed on the data-snapshots of step 220 in order to pre-process those data-snapshots preparatory to subsequent steps. In some embodiments, energy analysis module 110 and its like-numbered items of FIG. 1A-1D perform step 225. The result of step 225 is a set of one or more pre-processed snapshots. Examples of pre-processing operations are shown in FIG. 3.

In step 230, spatial measurements are calculated from the set of pre-processed snapshots of step 225. In some embodiments, spatial measurement module 112 and its like-numbered items of FIG. 1A-1D perform step 230. The result of step 230 is a set of one or more spatial measurements. FIG. 6 shows examples of spatial measurements.

Figure 15:
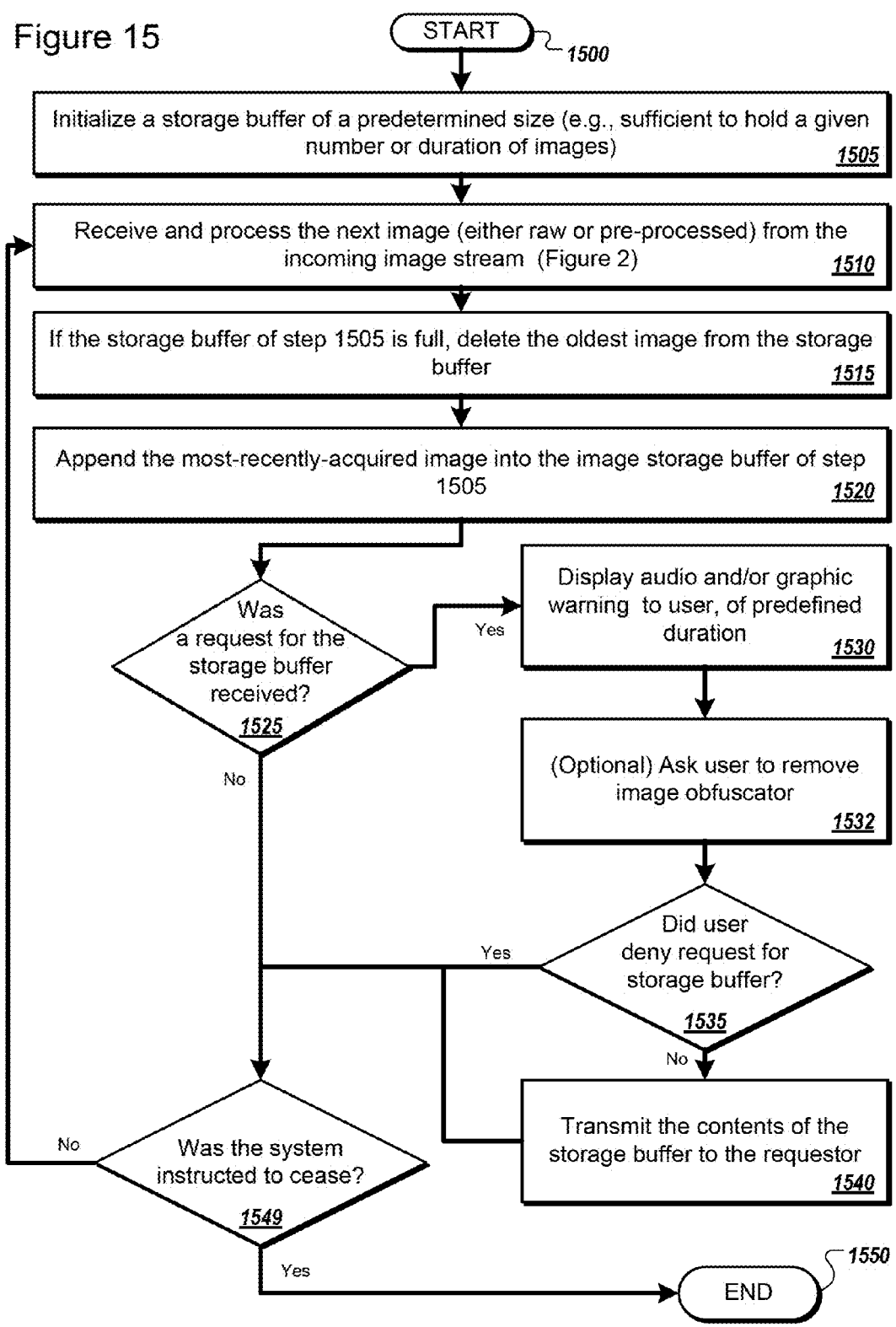
FIG. 15 shows a flowchart to enable a third-party to request a circumscribed video snippet according to a specific embodiment of the present system and method.

In step 235, zero, one, or more than one of the data-snapshots from step 220 and the pre-processed snapshots of step 225 are discarded. The more quickly that the snapshots are discarded, the better-protected is the end-user's privacy. In some embodiments, no snapshots are retained at all—these embodiments provide maximum privacy protection, but preclude many mechanisms for confirmation or forensics when a fall or other event occurs. In some other embodiments, some snapshots are temporarily stored in order to provide confirmation or forensics when an event of interest occurs, such as a person falling down. In some embodiments, temporary storage module 116 and its like-numbered items of FIG. 1A-1D is used to store snapshots temporarily. FIG. 15 shows an example of storing a buffer of images for confirmation or forensics.

In step 240, body measurements are calculated from the set of spatial measurements of step 230. In some embodiments, body measurement module 114 and its like-numbered items of FIG. 1A-1D perform step 240. The result of step 240 is a set of one or more body measurements. FIG. 12 shows examples of body measurements.

In step 245, the body measurements are stored and/or transmitted elsewhere. For example, the body measurements may be transmitted over the Internet to a separate computer server. In order to better protect user privacy, embodiments of the present inventive method preferably transmit only the body measurements of step 245, not the data-snapshots of step 220 or the pre-processed snapshots of step 225. The body measurements of step 245 preferably are designed to resist reverse-engineering, such that, for example, a visual picture of the end-user cannot be reconstructed from them. The body measurements of step 245 may include alerts, triggers, or warnings—for example, that a fall event may have been detected.

Step 248 checks whether all desired measurements have been acquired according to a desired accuracy, rate, threshold, or duration of time. In some embodiments, step 248 executes indefinitely. In some embodiments, step 248 executes only while a switch or toggle has been set to the "on" position. In some embodiments, step 248 executes only during certain times of day. In general, step 248 allows any type of calculation or decision-making process to determine whether to continue execution or to halt.

FIG. 2B shows a high-level flowchart describing a preferred embodiment of the present system and method, beginning at step 250. FIG. 2B is analogous to FIG. 2A, with the changes that the energy emitter of FIG. 2A is omitted, and the energy-sensor of FIG. 2A is narrowed to a standard visual-light camera such as those available on commercial phones or tablets. FIG. 2B thus emphasizes that some embodiments of the present system and method may be conducted on standard, commercially-available phones and tablets. The items and steps in FIG. 2B correspond to their like-numbered items in FIG. 2A.

FIG. 3 lists some examples of pre-processing analysis that may be carried out by, for example, energy analysis module 110 or by step 225. The operations listed in FIG. 3 are standard image-processing algorithms that are well-known in the art. "Resize" resizes an image to make it larger or smaller. "Convert to grayscale" converts a color image to grayscale. "Threshold" zeroes out any pixels that correspond to a given range of values; for example, very light-colored or very dark-colored pixels. "Subtract" or "diff" mathematically subtracts one image from another. "Absolute subtraction" or "absolute diff" mathematically subtracts one image from another than takes the absolute value. "Bitwise logical" performs a logical operation, such as AND or XOR, between two images. "Filter" performs a mathematical filter or convolution, such as the median filter, on an image. "Erode" or "dilate" are examples of morphological operations that shrink or expand portions of an image. "Edge detection" and "histogram of gradients" highlight areas of contrast or gradients in an image. There are many additional image analysis operations, not shown in FIG. 3, that may be brought to bear within the present inventive method—for example, Fourier transforms, Laplace transforms, and so on.

As described above, some embodiments of the present inventive method are intended to operate in substantially real-time despite executing on relatively low-end hardware that is, for example, constrained by processor speed and memory. As described above, some embodiments of the present inventive method are intended to operate correctly even in the presence of an obfuscator that distorts or blurs incoming images (in order to protect user privacy). In general, different pre-processing operations will have different feasibility for low-end hardware and for the presence of an obfuscator, as shown in FIG. 3. For example, the operation "histogram of gradients" is a popular image-processing method for detecting the outlines of human beings from clear, high-resolution photos, but this operation may execute too slowly for real-time operation on many low-end hardware configurations, and may fail to correctly detect shapes when presented with obfuscated images. Some embodiments of the present inventive method preferably utilize pre-processing operations that run very quickly and that are robust to obfuscation, as shown in FIG. 3. Because restricting the space of such pre-processing operations circumscribes the pathways available to ultimately detect and measure human movement, the choice of operations from FIG. 3 impacts the methods of other computations downstream—for example, the operations shown in FIGS. 6 and 12. Some embodiments of the present inventive method are designed to implement novel computational methods to respond to the limitations imposed by FIG. 3—for example, by using the operations listed in FIGS. 6 and 12.

Figure 4A:
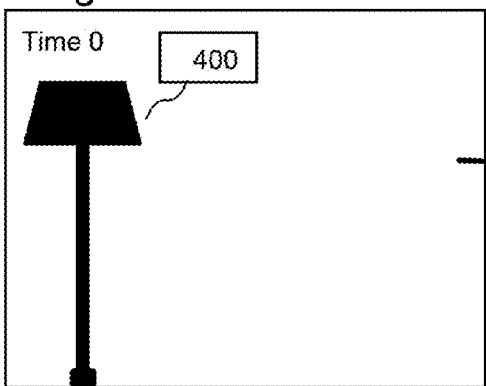
FIGS. 4A-4E show an example of creating a "movement mask".
Figure 4B:
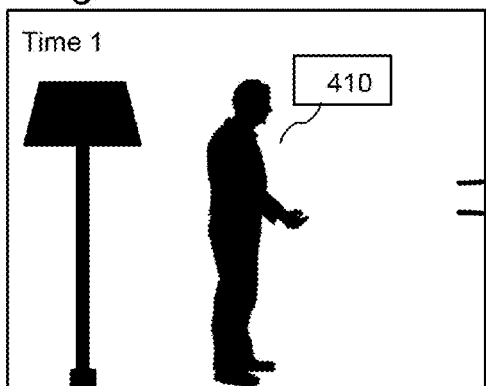
Figure 4C:
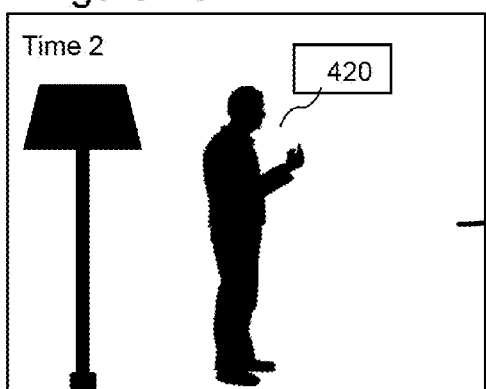

In some embodiments of the present inventive method, it is important to isolate the shape or silhouette of a human being from other objects in the field-of-view. As an example of such isolation, also called "segmentation", FIG. 4 shows an example of using a pre-processing methodology to remove background objects, such as furniture, from a field-of-view. In the example of FIG. 4, the "subtract" (also called "diff") operation of FIG. 3 is utilized on sequential images from energy sensor 104. FIG. 4A shows an image at time 0 where a furniture lamp 400 is present, but no human. FIG. 4B shows an image slightly later, at time 1, where a human 410 has entered the field-of-view. FIG. 4C shows an image slightly later, at time 2, where the human 420 has raised an arm. The images in FIGS. 4A-4E are all assumed to be composed of pixels (not individually highlighted).

Figure 4D:
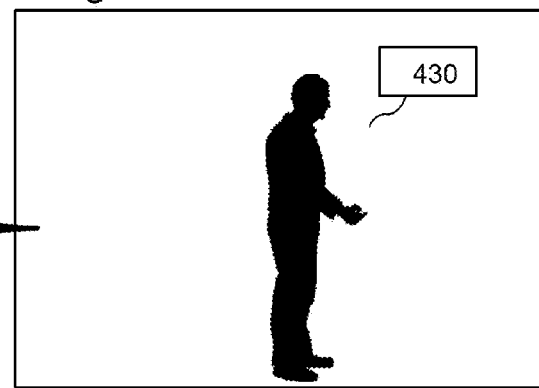
Figure 4E:
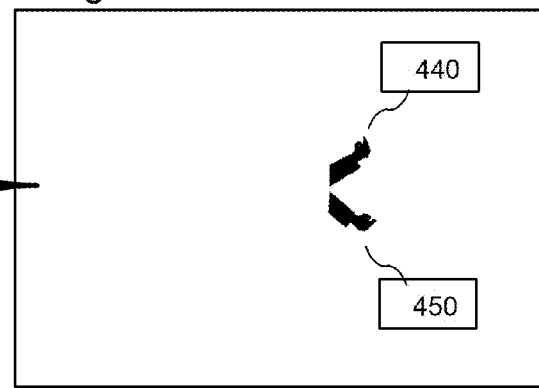

FIG. 4D shows the result of subtracting the pixels in FIG. 4A from the pixels in FIG. 4B. The stationary lamp 400 is removed by the subtraction. FIG. 4E shows the result of subtracting FIG. 4B from FIG. 4C. The stationary lamp 400 and most of the human 410 and 420 are removed. It may be seen from FIGS. 4D and 4E that sequential image subtraction is generally good at removing background objects, but unfortunately also removes much of the human figures that we are interested in measuring further.

FIGS. 5A-F show an example of an improved pre-processing methodology to remove background objects. FIGS. 5A-F also uses the "subtract" method from FIG. 3, but in a more sophisticated fashion than was employed in FIG. 4. FIGS. 5A through 5C correspond to their like-numbered images in FIG. 4. FIG. 5D subtracts the image at time 0 from the image at time 2, while FIG. 5E subtracts the image at time 1 from the image at time 2. FIG. 5F subtracts FIG. 5D from FIG. 5E. The result of these cascading subtractions, as shown in FIG. 5F, is to remove the undesired background lamp, while preserving the desired human figure. Thus, the series of operations in FIGS. 5A-F may be used to segment, that is, to isolate, the approximate shape or silhouette of the human being in the field-of-view. FIGS. 5A-F also have the advantage that it is robust to image obfuscation such as may be imposed by obfuscator 108. One drawback, in some implementations, to the methodology employed in FIGS. 5A-F is that the human silhouette 550 may become faint, or disappear altogether, if the real-life human being remains motionless—so the methodology of FIGS. 5A-F is best at segmenting a human figure when the figure is in motion. The methodology shown in FIGS. 5A-F may be poor at distinguishing multiple people from each other, or people from other moving objects such as a rotating fan or a pet.

FIGS. 5G-L illustrate another example of an improved pre-processing methodology to remove background objects. FIGS. 5G-L also uses the "subtract" method from FIG. 3, but in a more sophisticated fashion than was employed in FIG. 4. FIGS. 5G through 5I correspond to their like-numbered images in FIG. 4 and FIGS. 5A through 5C. Similar to FIGS. 5D and 5E, FIG. 5J subtracts the image at time 0 from the image at time 2, while FIG. 5K subtracts the image at time 1 from the image at time 2. FIG. 5L is achieved by performing a bitwise AND operation on FIGS. 5J and 5K. The result of these cascading operations, as shown in FIG. 5F, is to remove the undesired background lamp, while preserving the desired portion of the human FIG. 560. Thus, the series of operations in FIGS. 5G-L may be used to segment, that is, to isolate, the approximate shape or silhouette of the human arm, thereby capturing the change between FIGS. 5H and 5I.

In general, different pre-processing methodologies, such as those shown in FIGS. 4 and 5, will have different advantages and drawbacks. In general, energy analysis module 110 may carry out any set of analysis operations on any set of images acquired, past or present, from energy sensor 104. For example, an additional methodology to segment a human shape or silhouette, not shown in FIG. 4 or 5, is to save a so-called "background image" at a moment in time when the human user is presumed to be absent; and then to calculate a subsequent pixel subtraction ("diff") against that background image later on, when a human is presumed to be present. There are multiple drawbacks to this methodology, however, including 1) the difficulty in "guessing" when no human is present, leading to potentially high error rates, and 2) storage of an image for an indefinite period of time, thus endangering user privacy.

Returning to FIG. 3, methods such as those listed in FIG. 3 may be utilized in any order or combination to pre-process data-snapshots or images so as to, for example, identify motion; segment human figures; remove background information; attenuate noise; or carry out any desired pre-processing operations. FIGS. 4 and 5 show examples of such pre-processing, as described above, but many other types of pre-processing are possible. As used herein, the term "movement mask" refers to a segmentation or isolation of a human shape or silhouette from a sequence of images wherein the human may be in motion, as shown by the examples of FIGS. 4 and 5. The term "movement mask" reflects the fact that we are interested in how people are moving, not in how they are staying still.

FIG. 6 lists some examples of spatial-measurement calculation that may be carried out by, for example, spatial measurement module 112 or by step 230. Spatial-measurement calculations, such as those shown in FIG. 6, are intended to measure distances, angles, or locations within space—typically calculated from a single image at a time—which in turn may be further analyzed or combined to determine body measurements (as shown in FIG. 12).

Figure 9:
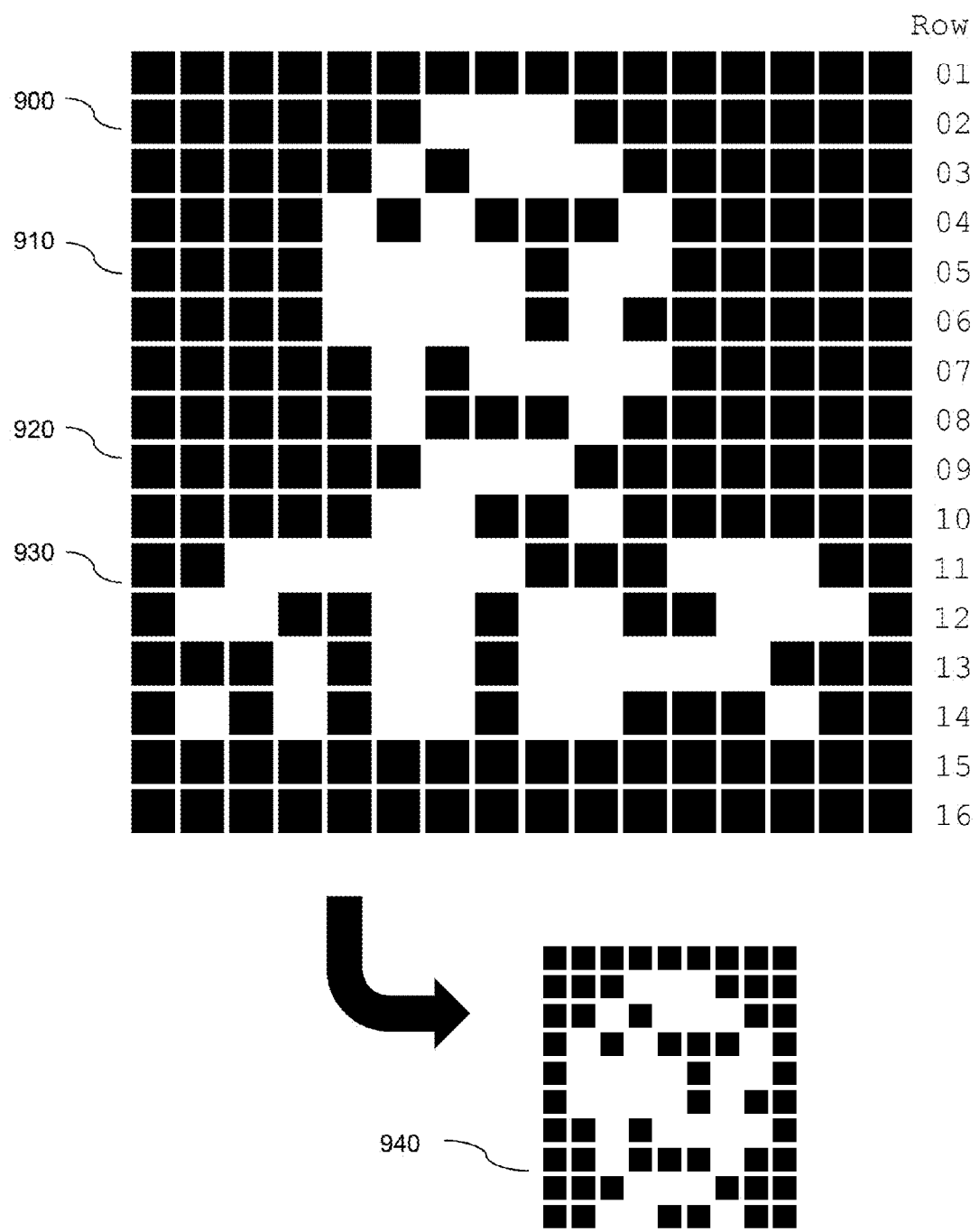
FIG. 9 shows an example of calculating row-width maxima to detect the head of a person within an image.

The first four spatial measurements shown in FIG. 6 are found to be particularly effective in the methods and systems presented herein, separately and, particularly, in combination (2, 3, or all 4 of the measurements). "Topmost pixel row" determines which row of an image contains the topmost pixels corresponding to a segmented human figure—as described further below, these pixels usually correspond to the top of the head, unless the human has arms upraised. "Row-width maxima" is used to rapidly and robustly estimate the boundaries of a human head; an example is shown in FIG. 9. "Corner brightness" is used to adjust for changes in image brightness. "Mask proportion" is used to estimate the signal-to-noise quality of a "movement mask". These spatial measurements are discussed further below.

The remainder of the spatial measurements shown in FIG. 6 are described below. "Centroid" calculates the mathematical centroid of a set of pixels. "Curve fitting" refers to a family of methods, such as ellipse-fitting, which attempt to match predefined mathematical curves to segmented figures or masks; such methods are vulnerable to noise and obfuscators, and are slow to execute. "Skin-color detection" refers to a family of methods which seek pixels that correspond to typical colors of human skin; such methods, though quick-running, are vulnerable to noise and obfuscators. "Object recognition" refers to a heterogeneous family of methods which apply widely diverse methods in order to detect shapes, such as human head-and-shoulder shapes; such methods are vulnerable to noise and obfuscators, and are slow to execute. "Facial recognition" refers to a commonly-used family of methods known in the art, which seek human faces in images; such methods are robust to noise, but almost always defeated by obfuscators and by body posture (e.g., facing away from the camera), and are slow to execute. "Sensor tilt" is a special case—the angular tilt of the energy-sensor 104, relative to the horizontal floor of the surrounding room, can impact various other mathematical measurements (including, but not limited to, those shown in FIG. 6) by changing the projective aspect of a human being. This means that the value of the "sensor tilt" may sometimes be used to adjust other spatial measurements, as shown in FIG. 11.

Figure 7A:
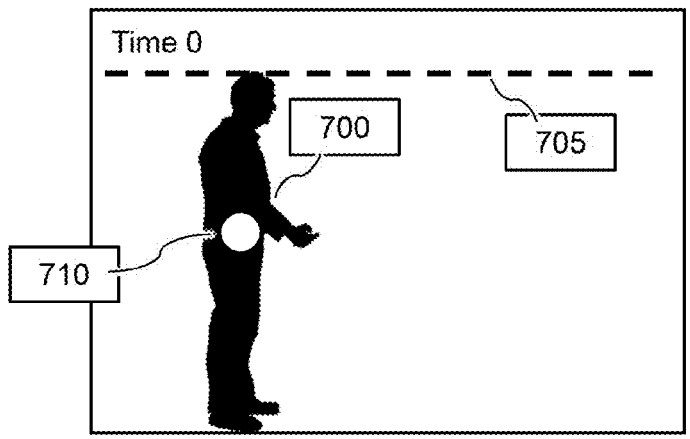
FIGS. 7A-7C show examples of changes in spatial measurements that may indicate a fall event.
Figure 7B:
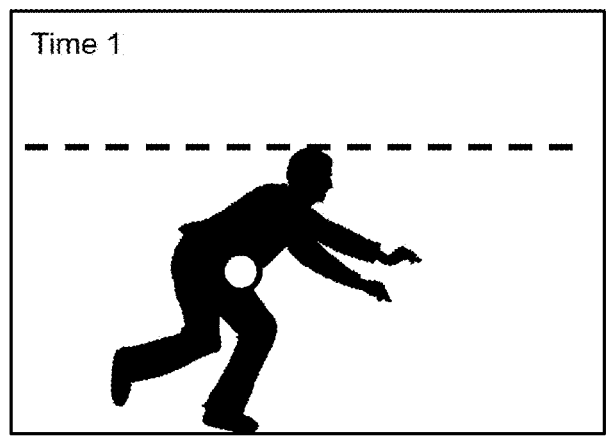
Figure 7C:
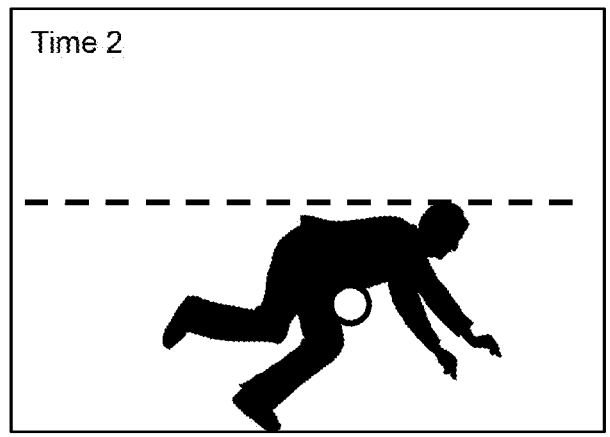

FIG. 7 shows an example of a spatial measurement corresponding to the top of a human head, which may correspond to, for example, the "topmost pixel row" of FIG. 6. FIG. 7A shows an image at time 0, where a person 700 is standing upright. FIG. 7B shows a slightly-later image at time 1, where the person has started to fall over. FIG. 7C shows a slightly-later image at time 2, where the person continues to fall over. Each image 7A to 7C is assumed to have been pre-processed in such a way as to remove background images, such as furniture, as was described above; the human silhouette 700 corresponds, in this example, to a "movement mask". In each image 7A to 7C, the method "topmost pixel row" of FIG. 6 is applied to each segmented human shape. The result is a relative (not absolute, at least not yet—because so far we are relying only on pixels, which do not correspond to absolute spatial distances, such as centimeters) change in position of the top of the person's head from image to image. This type of spatial measurement may be subsequently used, for example, to detect a falling-down or a sitting-down event. For example, a rapid descent in the position of the top of the person's head from image-to-image over a short period of time, all the way to the bottom edge of the field-of-view, may correspond to a person falling down. For example, a similar pattern of rapid descent, but stabilizing halfway down the field-of-view, may correspond to a person sitting down. As a further example, the change in mathematical centroid 710 (which corresponds to the "centroid" spatial measurement of FIG. 6) may be used to supplement, or to replace, the use of "topmost pixel row" 705 in detecting a possible fall event.

Both the topmost pixel row 705 and centroid 710 of movement mask 710 will descend at a rapid rate during a fall event; and also, both the topmost pixel row 705 and centroid 710 will descend to an end-point level below the horizontal midline of the field-of-view at the end of a fall event. These calculations correspond to the rate of descent of step 1330 and the end-point of descent of step 1335 in FIG. 13, discussed below.

Figure 8A:
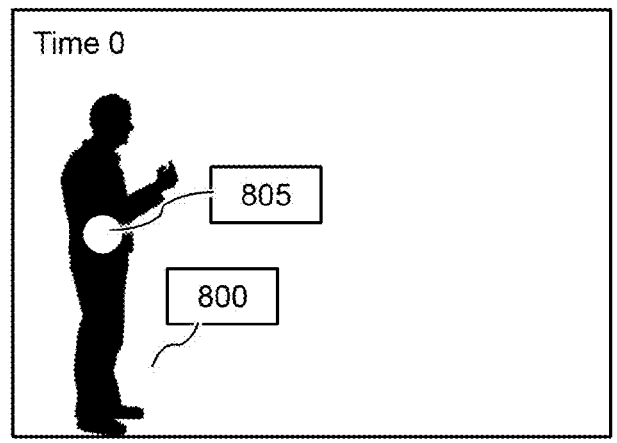
FIGS. 8A-8C show examples of changes in spatial measurements that may indicate a movement event.
Figure 8B:
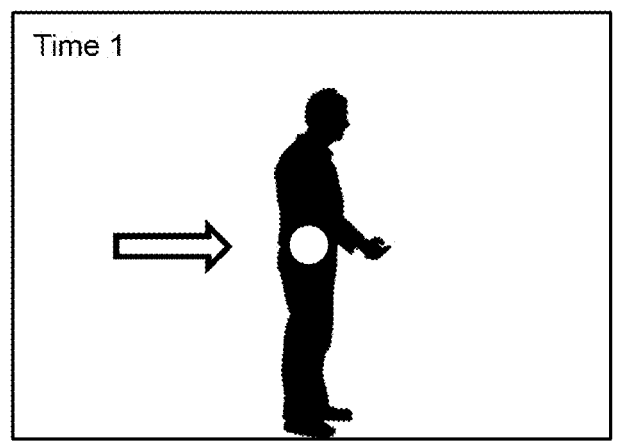
Figure 8C:
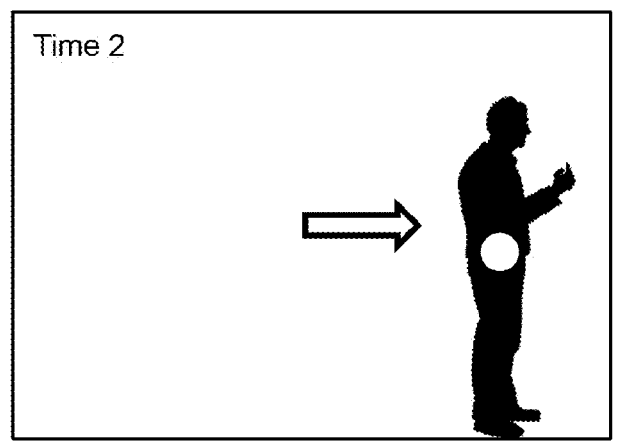

In some embodiments, it is desirable to obtain spatial measurements that indicate other aspects of a human's movement, in addition to (or instead of) fall detection. FIG. 8 shows an example of using a spatial measurement to determine the direction in which a human is walking. FIG. 8A shows an image at time 0, where a person 800 has entered the field-of-view. FIGS. 8B and 8C show slightly-later images during which the person is walking left-to-right across the field-of-view. As in FIG. 7, it is assumed that background objects have been pre-processed out of each image. For each image in FIG. 8, the centroid 805 (approximately equivalent to the center-of-mass) from FIG. 6 is applied to the shape of the person 800. The trend of the centroid towards right or left halves of the field-of-view corresponds to the direction of walking of the human.

As described previously, some embodiments of the present inventive method are intended to operate in substantially real-time on relatively low-end hardware that is, for example, constrained by processor speed and memory. As described above, some embodiments of the present inventive method are intended to operate correctly even in the presence of an obfuscator that distorts or blurs incoming images (in order to protect user privacy). In general, different spatial-measurement operations will have different feasibility for low-end hardware and for the presence of an obfuscator, as shown in FIG. 6. The majority of methods known to the art fail under such conditions, and cannot be preferably deployed within embodiments of the present inventive method. To overcome this obstacle, various embodiments presented herein feature one or more of the following: "row-width maxima", "corner brightness", and "mask proportion". These are shown in FIG. 6 and described next.

FIG. 9 shows the use of "row-width maxima" to determine the bounds of a human head within a collection of pixels. FIG. 9 shows an example bitmap of black-or-white (binary) pixels corresponding to the head and shoulders of a human. As described above, FIG. 9 may correspond to a portion of a "movement mask". Although the example in FIG. 9 displays binary pixels for simplicity, the method "row-width maxima" as described herein is applicable to full-color pixels as well.

The example bitmap shown in FIG. 9 is obviously noisy, with many pixels incorrect. Such noise is both typical and, in fact, virtually unavoidable in real-world situations. As described above, some embodiments of the present inventive method are intended to operate correctly even under the conditions of real-world noise. This is an important difference between the present inventive method and much prior art, wherein the prior art works well under controlled research laboratory conditions, but fails when applied to real-world conditions.

The procedure "row-width maxima", an example of which is shown in FIG. 9, works as follows. The topmost row of body-shape pixels 900 is assumed to correspond to the top of a human head in the field-of-view. Then each following row of pixels in the image is examined, one by one, while measuring width between the first white pixel (corresponding to a portion of the user's body) and the last white pixel in each row. The row where the widths cease to increase and start to decrease, corresponding to the middle of the head 910, is marked. The procedure continues to descend down each row of pixels, measuring widths between first and last white pixels. The row where the widths cease to decrease and start to increase, corresponding to the neck 920, is marked. The row where the widths increase suddenly and quickly, corresponding to the shoulders 930, is marked.

The local row-width maxima 910 (middle-of-head) and 930 (shoulders) are found to be the most important. These measurements establish the bounding box of the head 940. The local row-width minima 900 (top-of-head) and 920 (neck) may be used to double-check that the maxima seem reasonable. The "row-width maxima" methodology shown in FIG. 9 has the advantages of very fast execution speed and robustness to noise. Its output is the bounding box 940 of a human head in the field-of-view. One minor drawback is that the methodology of FIG. 9 may perform suboptimally when the user is walking around with hands raised above shoulder height, because the position of the arms may be misinterpreted by the procedure as the borders of the head—but, this type of human posture, especially when maintained for more than a few seconds, is unusual and is rarely, if ever, encountered.

The novel spatial measurements "corner brightness" and "mask proportion" in FIG. 6 are intended to detect real-world situations where incoming images are likely impaired in some way, such that measurements on those images should not be trusted (i.e., the best course of action is to temporarily cease obtaining measurements and wait for the images to improve). There are two common real-world situations where image quality is badly impaired in this way.

The first common situation where image quality is impaired happens in the use of low-end camera which possess so-called "automatic gain" or "automatic exposure" features that cannot be turned off. Such cameras, when their environment becomes darker, automatically increase their "open-shutter" duration in order to acquire more ambient photons and thus increase the brightness level of their images. Such behavior can be triggered simply by a user moving physically nearer to the camera (because such motion blocks out ambient light sources, such as lamps). The result is a sudden change in overall image brightness. The method "corner brightness" in FIG. 6 measures the brightness of the regions of one or more of the four corners of the field-of-view; if the brightness of one or more of these regions suddenly changes, it is possible that the "automatic gain" of the acquiring camera has kicked in, and the "corner brightness" may then be used to adjust the overall brightness of the image in order to compensate.

The second common situation where image quality is impaired happens when the user draws so close to the camera that the user occupies most, or all, of the field of view. In this case, there is no way to locate specific portions of the user's body. The method "mask proportion" in FIG. 6 may be used to guard against this situation. "Mask proportion" refers to the number of pixels, or alternately the bounding box dimensions, of the "movement mask", divided by the number of pixels, or alternately the enclosing dimensions, of the entire field-of-view. If this proportion rises above a pre-determined threshold, then it may be assumed that the user has drawn too close to the camera, and spatial-measurement gathering may be temporarily paused until the user moves further away again. As an alternate estimate, the absolute size—rather than the proportion—of the "movement mask" may be used instead.

In general, methods such as those listed in FIG. 6 may be utilized in any order or combination to calculate spatial measurements so as to, for example, identify the location and extent of the user's head; identify the location of the user's hands; respond to ambient conditions that may impact image analysis; or carry out any desired spatial-measurement operations. FIGS. 7, 8, and 9 show examples of such spatial-measurement calculation, as described above.

FIG. 10 is a flowchart overview of the calculation of the "movement mask" and related spatial measurements by one embodiment of the present inventive method. Step 1005 begins by collecting 3 sequential images from the camera. Steps 1010, 1015, and 1020 apply the pre-processing methodology described in FIG. 5, accompanied by additional operations (grayscale, threshold, bitwise logical AND, and erosion) to further reduce real-world noise while segmenting (separating) the human figure from background. The result of step 1020 is a "movement mask", or silhouette, of a human figure. Step 1025 conducts zero or more spatial measurements, such as the measurements shown in FIG. 6. The spatial measurements of Step 1025 are subsequently utilized to calculate body measurements, as described below. Step 1045 discards the oldest image, and collects a new image from the camera, so that 3 images are retained at any given moment. Step 1049 continues execution until the system is instructed to halt operation, for example, by a user turning the system off.

We now describe how to calculate real-world distances from acquired image data. In some embodiments of the present invention, the images received from energy sensor 104 are in the form of pixel rasters, or equivalently, pixel arrays. For example, almost all cameras that are aboard commercially-available mobile phones and tablets provide image data in the form of pixel arrays. In some embodiments that receive pixel arrays, we wish to be able to convert certain spatial straight-line distances in the image (measured in number of pixels) to the corresponding spatial straight-line distances in the real world (measured in for example, number of millimeters). But in general, the problem of converting pixel distances to real-world distances, in the absence of calibration devices or multiple cameras, is extremely difficult or even impossible. Any particular object in the field-of-view may be located near to, or far from, the camera; there is no general way to measure the real-world distance to, or between, objects if all we have to work with is a 2D array of pixels.

However, we may simplify the problem of real-world distances by constraining our inquiries to only those spatial distances that describe the movement of a human being in the field-of-view (as opposed to, say, background objects in the field-of-view). In this case, the head of the human being acts as a convenient calibration object. The size of a typical adult human head is approximately 20 cm wide by 30 cm high. So if we are able to detect the approximate bounding box of a human head in the field-of-view, then by assuming the head is that of a normal-sized adult, we have a means to convert pixel distances to real-world distances so long as the pixels in question correspond to portions of the human being. Fortunately, we do have such a mechanism: as described above, FIG. 9 shows a novel method to rapidly estimate the bounding box of a human head in the field-of-view. Other methods to detect the bounding box of a head, such as ellipsoid fitting, may be used, but as described previously, these may execute too slowly or be too susceptible to noise for real-world use.

FIG. 11 shows examples of how to map pixel distances (in image data) to real-world distances. In some cases, distance calculations may be relative—that is, we may be able to calculate that the real-world distance between two points in space is, say, 50 millimeters, even though we cannot precisely place the two points in space relative to the camera or the external world. In other cases, distances may be absolute—that is, we may be able to calculate the real-world distance from, say, the camera to a point in space.

Figure 11A:
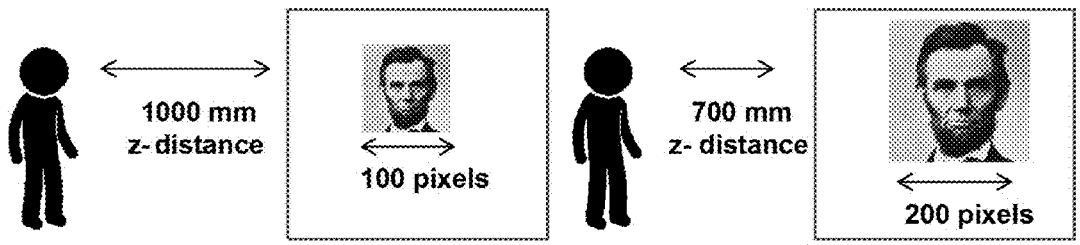
FIGS. 11A-11D show mechanisms to estimate real-world spatial distances that may be performed by embodiments of the present system and method.

FIG. 11A describes how to calculate the relative real-world distance traversed by a human being who moves closer to, or farther from, the camera. We refer to the spatial axis extending from the camera straight forward into the field-of-view as the "z-axis"—so FIG. 11A describes how to measure relative movement traversed by a human along the z-axis. In the example shown in FIG. 11A, the human is initially located 1000 millimeters from the camera, and the width of the human's head in the pixel array is 100 pixels. Sometime later, the human is located 700 millimeters from the camera, and the width of the human's head in the pixel array has increased to 200 pixels. Due to proportionality of the laws of the perspective, the change (delta) in the human's distance from the camera (in millimeters) is equal to (1000−700)/(100-200) times the change in the width of the head (in pixels). This example may be generalized to any z-distances or head-width-values. Therefore, we now have a means to calculate changes in real-world z-distance of the human from the camera, based on changes in the measured width of the head in pixels. We can use such calculations to, for example, determine a human being's real-world walking speed along the camera's z-axis.

The calculations just described are relative, not absolute. However, an additional calibration step (not shown in FIG. 11) enables us to perform absolute real-world distance measurements along the z-axis: we only need to measure the pixel-width occupied by a typical-sized adult human head in the pixel array data, at a known distance from the particular camera we are using. Under the assumption that most adult human heads have approximately the same dimensions, this calibration measurement, along with the laws of perspective, lets us freely map between image head-width (or head-height) in pixels; real-world head-width (or head-height) in, say, millimeters; and real-world distance of the human being from the camera in, say, millimeters.

Figure 11B:
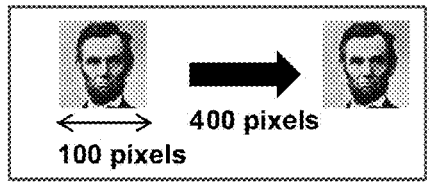

FIG. 11B describes how to calculate the relative real-world distance traversed by a human being who moves to the left, or to the right, of the camera. We refer to the spatial axis extending left-and-right from the camera as the "x-axis"—so FIG. 11B describes how to measure relative movement traversed by a human along the x-axis. At one moment in time, we determine the width of the human being's head, and assume that the width corresponds to 200 mm. At a subsequent moment in time, let us say that the human's head has moved to the right 400 pixels, while its pixel-width has stayed about the same (indicating that the human is moving left-to-right while remaining at an approximately constant z-distance from the camera). Then the real-world x-distance covered is (200/100)*400 millimeters. Under the assumption that most adult human heads have approximately the same dimensions, we may now calculate real-world movement (for example, in millimeters) of the human being along the x-axis.

Similar calculations—not shown in FIG. 11—may be deployed along the "y-axis", which is the spatial axis extending from the camera to the center of the earth, on the one hand, and upward to outer space, on the other hand.

Combining the calculations available to us along the x-axis, y-axis, and z-axis, we may estimate the real-world movement of a human being based on the width and/or height of the human being's head across a series of images. By assuming an approximately 20 cm×30 cm dimension of the average adult human head, we now have means to calculate both relative and absolute movement of a human being in the field-of-view.

These methods for calculating real-world movement are robust to real-world use, with only minor limitations. For example, if the human being in the field-of-view is a child instead of an adult, the calibration assumption will be incorrect; however, it is easy to change the calibration metric accordingly if it is known that the end-user will be a child. Note that human adults with unusual heights, such as may occur in, for example, dwarfism, typically have the same head dimensions as non-dwarf humans, so that their calibration metrics are unchanged. For example, if there are multiple human beings in the field-of-view, it may be difficult to differentiate heads from each other, or match heads to bodies; however, some embodiments of the present invention are intended for use with only one end-user (for example, an older adult who is alone for much of the time).

Figure 11C:
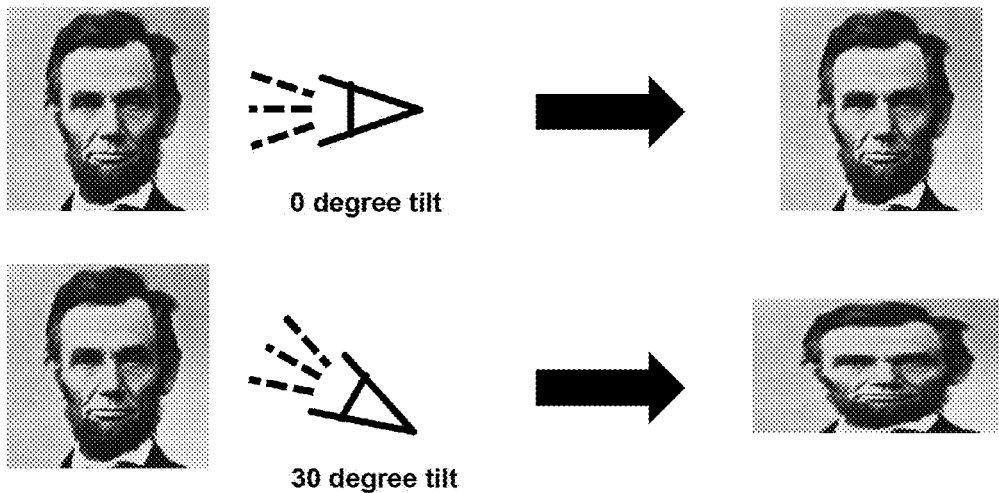

FIG. 11C shows the effect of tilting the image-acquisition camera with respect to horizontal. Camera tilting distorts each acquired image by changing the projective aspect of the human being onto the camera, as shown schematically in FIG. 11C, and may require modification to the spatial-distance methods described above.

Figure 11D:
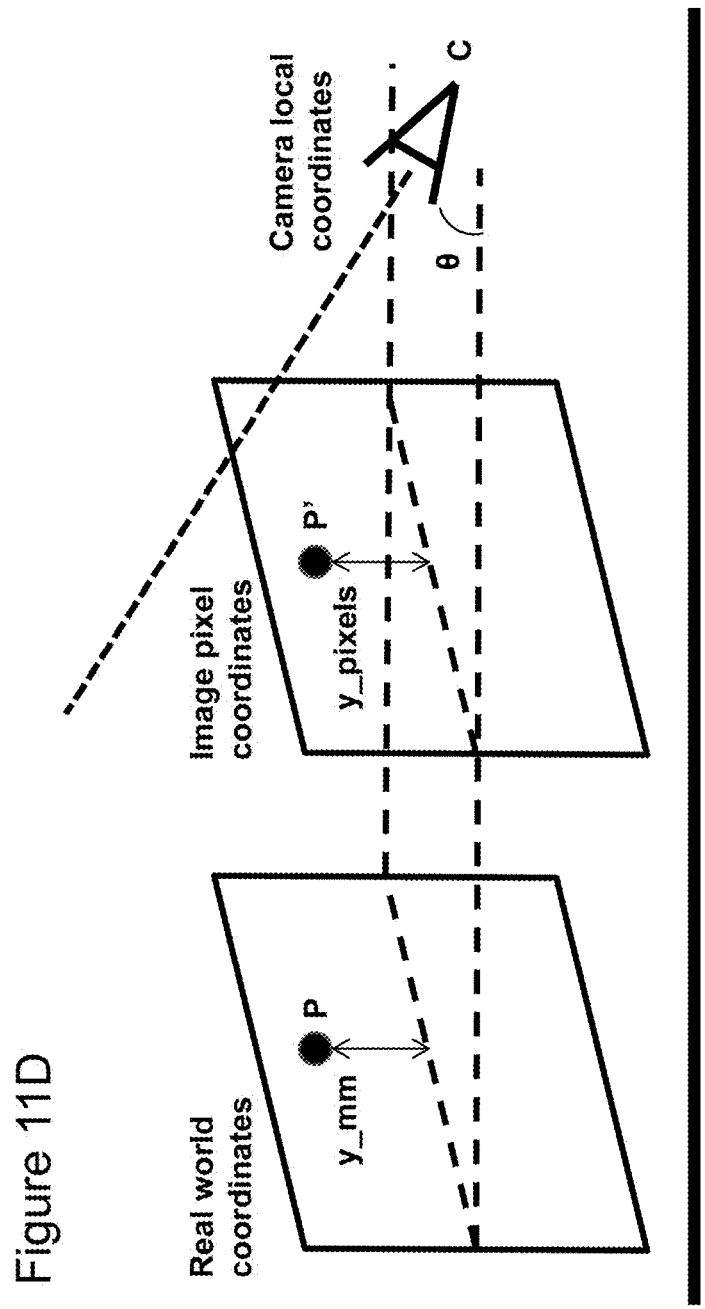

One way to avoid tilt distortion is to require that the camera always be placed facing substantially horizontally into the field-of-view. If the camera must be tilted, though, FIG. 11D is a schematic of an example of the problem to solve. Basically, we need to be able to convert between three coordinate frames of reference: the real-world coordinate frame, in which the camera defines origin (0, 0, 0) and the x-, y-, and z-axis are as described previously; the image pixel array coordinate frame, in which typically the upper-left corner defines origin (0, 0); and the camera's local coordinate frame, in which one or more of the x-, y-, and z-axis may be rotated with respect to the real-world coordinate frame. In FIG. 11D, the camera is labeled C; the camera's angle of rotation with horizontal is labeled θ

(theta); a real-world point of interest is labeled P, at a real-world height y_mm (in millimeters) relative to the real-world height of the camera; and a corresponding pixel in the pixel array is labeled P' (P-prime), at an image height y_pixels (in pixels) above the vertical midpoint of the pixel array. Adjustment for tilt may then be performed using trigonometric computations.

In general, FIG. 11 shows examples of ways to estimate real-world distances from pixel-array data, and is not exhaustive. To summarize, the assumption that most human heads are approximately the same size, combined with earlier-described techniques to segment the approximate shape of the human head and/or body, enable us to estimate real-world distances and speeds traversed by a human being in the field-of-view.

FIG. 12 lists some examples of body-measurement calculation that may be carried out by, for example, body measurement module 114 or by step 240. Although the focus of many embodiments described herein is fall detection, it is evident from FIG. 12 that many other types of useful body measurements are capable of being obtained by the present inventive method. Body-measurement calculations, such as those shown in FIG. 12, are intended by some embodiments of the present invention to ascertain human activity or behavior either at a given moment in time, or throughout a given duration of time. Body-measurement calculations, as used herein, typically draw on one or more spatial measurements that, in turn, are collected from several contiguous images over some previous period of time—for example, the relevant spatial measurements might have been obtained from calculations performed on the most-recent five seconds' worth of images (recall that in some embodiments of the present inventive method, spatial measurements are retained while raw images are discarded). We next describe the body measurements of FIG. 12 in turn.

Head width, as discussed earlier, is a distance calibration that uses the width and/or height of a human head in the field-of-view (in pixels) as a "virtual yardstick" to estimate certain real-world spatial distances in the field-of-view. In some embodiments, the calibration assumes that a typical adult human head is 20 cm wide by 30 cm high.

Relative and absolute position/velocity of the head's distance above a reference horizontal plane such as the floor ("y-value"), as described earlier and shown in FIG. 7, may be calculated from the "topmost pixel" of FIG. 6; the "head width" calibration metric of FIG. 12; and/or the distance methods of FIG. 11. Head y-value body measurements may be used in some embodiments to detect that a person may have fallen down (a "fall event"), or alternately, that a person may have sat down or stood up. FIG. 13 shows an example of detecting a fall event.

As described previously, relative direction and/or speed of walking in the x-direction may be calculated from the "centroid" of FIG. 6. Absolute speed of walking in the x-direction may be calculated from the "centroid" combined with "head width" of FIG. 12. As described previously, relative direction and/or speed of walking in the z-direction may be calculated from the "head width" of FIG. 12. Absolute speed of walking in the z-direction may be calculated from the "head width" combined with an initial real-world head calibration, or another optical assumption (for example, that an object of known size at a known distance subtends a known angle in the camera's field-of-view). Relative direction and/or speed of walking in any direction may be determined by combining x- and z-values. Direction or speed-of-walking body measurements may be used in some embodiments to detect that a person is present or absent; that a person has transited to a known room; or that a person is achieving a certain activity level (e.g., number of room entrances/exits per day; number of steps per day; amount of time spent moving per day), or that the activity level is changing over time (e.g., the person is moving more slowly or more quickly than usual).

In some embodiments, the locations of one or both hands are determined. As described earlier, one way to detect human hands relies on skin-color detection; this method may be used in some embodiments when the obfuscator 108 does not substantially change the color of human-skin pixels. Other methods of hand-detection using object-recognition are known in the art and may be used in some embodiments. In some embodiments, the relative locations of hands and head are compared over time, and periodicity or repetition of hand-to-head movement indicates dining (eating) behavior.

FIG. 13 is a flowchart overview of video-based event detection by one embodiment of the present inventive method. As used herein, "event detection" refers to the detection of any event that may be of interest with regards to the present inventive method: this is typically, but not always, a fall event incurred by a human being (see FIG. 12 for examples of events).

Step 1305 begins by initializing a collection of time-stamped spatial measurements (examples of which are shown in FIG. 6). Step 1310 places a starting set of spatial measurements into the collection—for example, the collection might be sized so as to hold the past 5 seconds' worth of spatial measurements. Step 1315 determines the "movement mask" as described above. Step 1320 extracts the spatial measurements from the "movement mask" and stores them into the collection of spatial measurements. Step 1325 determines whether the spatial measurements are of high-enough quality and reliability to proceed further. For example, 1325 may compare the movement mask proportion or size (FIG. 6) to a pre-determined threshold (for example, 15% of the overall size of the field-of-view), to screen out the absence of any human being, or transient image fluctuations caused by sensor noise. Step 1330 measures how quickly the human being in the field-of-view, as represented by the movement mask, is descending vertically over some or all of the collection of spatial measurements, as shown, for example, in FIGS. 7 and 12. Step 1335 measures how far the human being in the field-of-view has descended up until the latest image, again as represented by the movement mask. Step 1340 evaluates the results of Steps 1330 and 1335 to determine whether an event of interest may have occurred.

For example, Steps 1130, 1135, and 1340 might determine that the human being's head had descended from the top of the field-of-view 5 seconds ago, to a new vertical level halfway down the field-of-view 3 seconds ago, and then remained at approximately the same vertical level up to the present moment—this sequence would likely correspond to the human sitting down. For example, Steps 1130, 1135, and 1340 might determine that the human being's head had descended from the top of the field-of-view 5 seconds ago, to a new vertical level halfway down the field-of-view 4.5 seconds ago, and then to another new vertical level almost at the bottom of the field-of-view 4 seconds ago—this sequence would likely correspond to the human falling down.

If the evaluation of Step 1340 indicates that an event of interest may have occurred, then an alert is triggered in Step 1355. Otherwise, the oldest spatial measurements are discarded from the collection of Step 1305, and the cycle repeats starting at Step 1315. The alert of Step 1355 may trigger any sequence of actions to warn, confirm, inquire, or request the user or any third party of system for any purpose relevant to the detected event. For example, the alert of Step 1355 may trigger the steps of FIG. 14.

FIG. 14 is a flowchart of an alert for fall detection that may be used by one embodiment of the present inventive method. In Step 1405, a message is transmitted to a separate system indicating that a fall alert has been initiated. For example, the message of Step 1405 may be an electronic message transmitted over the Internet. In Step 1410, a different message is prominently displayed to the end-user— for example, using loud noises and bright graphics—warning that a fall event is being triggered, and giving the user the opportunity to cancel the trigger if the user is actually doing fine. In other words, Step 1410 invites the user to reduce the occurrence of false positives. For example, Step 1410 might display a loud alarm noise and a bright flashing graphic, accompanied by a large "Cancel" button, on the screen of the same tablet device that is performing the steps of FIG. 13. Step 1415 checks whether and how the user responds within a given time period, for example, twenty seconds. If the user fails to cancel the alert, then Step 1420 sends a confirmation message to the system of Step 1405 that a fall appears to have been confirmed, and Step 1425 carries out further activities or interventions. For example, 1425 might have someone at a call center place a telephone call to the end-user. For example, 1425 might contact a local emergency-response service or ambulance. If Step 1415 detects that the user cancelled the alert, then Step 1430 lets the system of Step 1405 know that the alert was cancelled. The fall event flowchart ends at Step 1435.

As described above, some embodiments of the present inventive method are designed to protect user privacy by preventing the storage or transmission of private images. However, in some cases transmission of a specific set of images or video may be desirable, for example, in order to confirm that a fall took place; in order to perform forensics on a fall (i.e., determine what caused the fall); or in order to help the end-user optimally setup the present inventive method in his/her home.

FIG. 15 is a flowchart for transmitting well-defined images or video that may be used by one embodiment of the present inventive method. Step 1505 initializes a storage buffer of a predetermined size; for example, the buffer may hold the past 5 minutes' worth of images. Step 1510 receives and processes the next image from energy sensor 104, as described above. Step 1515 checks the storage buffer of Step 1505, and if the buffer is full, deletes the oldest image in the buffer. Step 1520 appends the image of Step 1510 into the storage buffer of Step 1505. Step 1525 checks whether a request for the storage buffer was received. For example, Step 1525 may check whether an emergency service is requesting the past five minutes' worth of images in order to confirm that a fall has actually occurred. Such requests may be, for example, communicated electronically over the Internet.

Step 1530 is analogous to Step 1410 of FIG. 14. Step 1530 alerts the end-user that a request for video has come in, and gives the user a chance to accept or reject the incoming request. Optionally, Step 1532 asks the user to remove the image obfuscator 108 if present, in order to improve the clarity of images. Step 1535 checks the response of the user. If the user refuses the request, then no images are transmitted. If the user accepts the request, or fails to respond, then the images are transmitted in Step 1540. Step 1549 repeats the cycle until the system is instructed to halt operation, for example, by a user turning it off.

FIG. 16 shows examples of potential sources of error that may be encountered by the present inventive method, and examples of how they may be countered or mitigated.

In some embodiments, system 100 may periodically record its own power status (e.g., on/off state), orientation (e.g., tilt angle), and/or location (e.g., via GPS). An external system or party may periodically query system 100 for said power status and/or orientation and/or location. For example, an external computer server may periodically query system 100 over the Internet to record the power state and/or orientation and/or location. If system 100 responds with an unexpected value (e.g., system 100 is on battery rather than AC power, or system 100 has been moved from its expected location), or if system 100 fails to respond, then an appropriate set of activities may be triggered (e.g., to determine whether system 100 has been unplugged or stolen).

In certain embodiments, an external computer system is used: to receive and store transmitted measurements and/or events from the system 100; to report the measurements/events to third parties, such as alerts sent to family/friends/caretakers; to monitor the system 100 for evidence of failure, theft, unexpected disconnection or power-off; and/or to send updates (e.g., software updates) and/or messages to system 100. The external computer system may be, for example, a server located on the cloud that receives ongoing messages and a system-health 'heartbeat' from the system 100.

Figure 17:
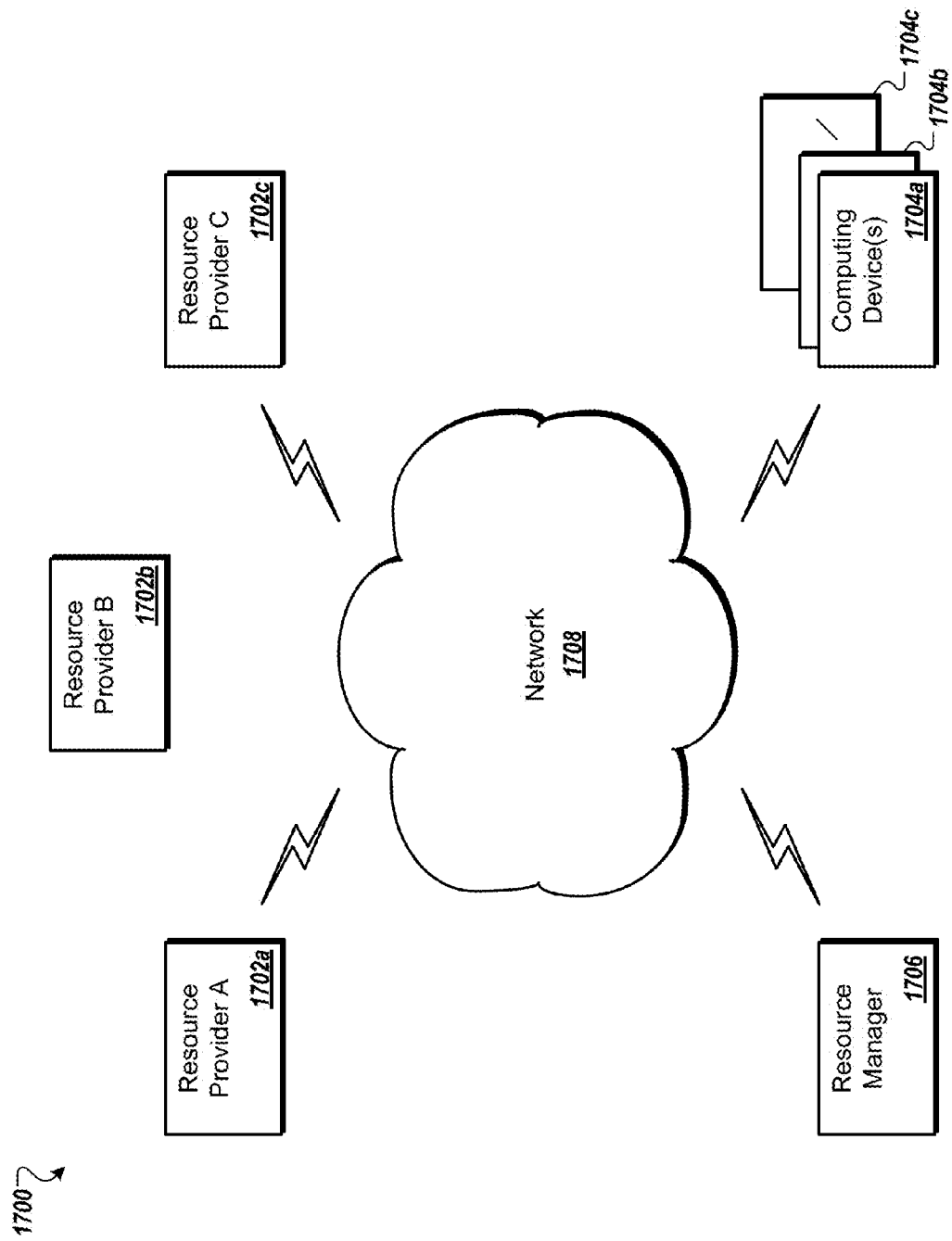
FIG. 17 is a block diagram of an example network environment for use in the methods and systems for automatic detection of a behavior of an individual, for example, a fall, according to an illustrative embodiment.

FIG. 17 shows an illustrative network environment 1700 for use in the methods and systems for analysis of spectrometry data corresponding to particles of a sample, as described herein. In brief overview, referring now to FIG. 17, a block diagram of an exemplary cloud computing environment 1700 is shown and described. The cloud computing environment 1700 may include one or more resource providers 1702a, 1702b, 1702c (collectively, 1702). Each resource provider 1702 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1702 may be connected to any other resource provider 1702 in the cloud computing environment 1700. In some implementations, the resource providers 1702 may be connected over a computer network 1708. Each resource provider 1702 may be connected to one or more computing device 1704a, 1704b, 1704c (collectively, 1704), over the computer network 1708.

The cloud computing environment 1700 may include a resource manager 1706. The resource manager 1706 may be connected to the resource providers 1702 and the computing devices 1704 over the computer network 1708. In some implementations, the resource manager 1706 may facilitate the provision of computing resources by one or more resource providers 1702 to one or more computing devices 1704. The resource manager 1706 may receive a request for a computing resource from a particular computing device 1704. The resource manager 1706 may identify one or more resource providers 1702 capable of providing the computing resource requested by the computing device 1704. The resource manager 1706 may select a resource provider 1702 to provide the computing resource. The resource manager 1706 may facilitate a connection between the resource provider 1702 and a particular computing device 1704. In some implementations, the resource manager 1706 may establish a connection between a particular resource provider 1702 and a particular computing device 1704. In some implementations, the resource manager 1706 may redirect a particular computing device 1704 to a particular resource provider 1702 with the requested computing resource.

Figure 18:
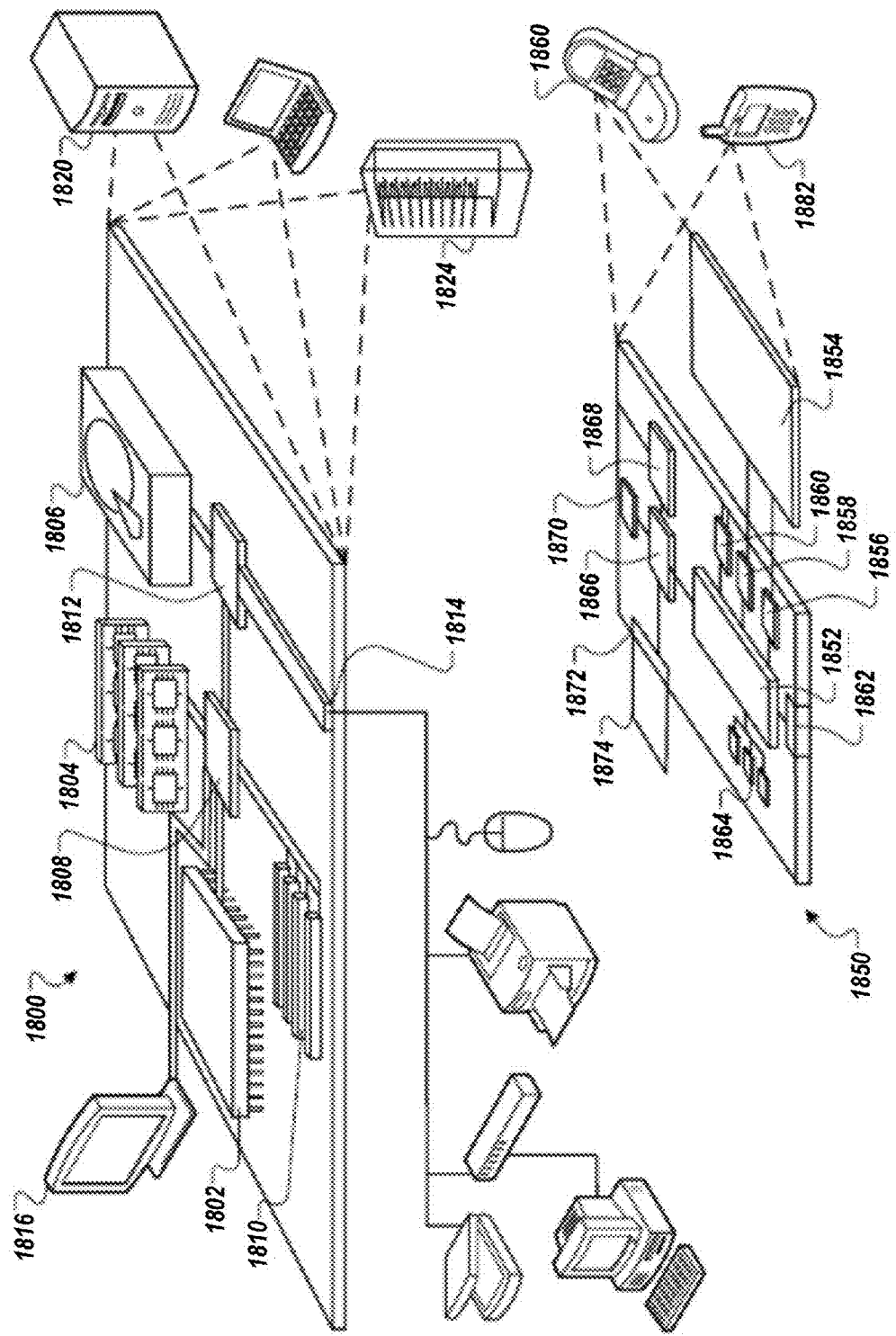
FIG. 18 is a block diagram of an example computing device and an example mobile computing device, for use in illustrative embodiments of the invention.

FIG. 18 shows an example of a computing device 1800 and a mobile computing device 1850 that can be used in the methods and systems described in this disclosure. The computing device 1800 is intended to represent various forms of digital computers, such as laptops, desktops, workstations, personal digital assistants, servers, blade servers, mainframes, and other appropriate computers. The mobile computing device 1850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1800 includes a processor 1802, a memory 1804, a storage device 1806, a high-speed interface 1808 connecting to the memory 1804 and multiple high-speed expansion ports 1810, and a low-speed interface 1812 connecting to a low-speed expansion port 1814 and the storage device 1806. Each of the processor 1802, the memory 1804, the storage device 1806, the high-speed interface 1808, the high-speed expansion ports 1810, and the low-speed interface 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as a display 1816 coupled to the high-speed interface 1808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1804 stores information within the computing device 1800. In some implementations, the memory 1804 is a volatile memory unit or units. In some implementations, the memory 1804 is a non-volatile memory unit or units. The memory 1804 may also be another form of computer-readable medium, such as a magnetic or optical disk.

The storage device 1806 is capable of providing mass storage for the computing device 1800. In some implementations, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1802), perform one or more methods, such as those described above. The instructions can also be stored by one or more storage devices such as computer- or machine-readable mediums (for example, the memory 1804, the storage device 1806, or memory on the processor 1802).

The high-speed interface 1808 manages bandwidth-intensive operations for the computing device 1800, while the low-speed interface 1812 manages lower bandwidth-intensive operations. Such allocation of functions is an example only. In some implementations, the high-speed interface 1808 is coupled to the memory 1804, the display 1816 (e.g., through a graphics processor or accelerator), and to the high-speed expansion ports 1810, which may accept various expansion cards (not shown). In the implementation, the low-speed interface 1812 is coupled to the storage device 1806 and the low-speed expansion port 1814. The low-speed expansion port 1814, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. In addition, it may be implemented in a personal computer such as a laptop computer 1822. It may also be implemented as part of a rack server system 1824. Alternatively, components from the computing device 1800 may be combined with other components in a mobile device (not shown), such as a mobile computing device 1850. Each of such devices may contain one or more of the computing device 1800 and the mobile computing device 1850, and an entire system may be made up of multiple computing devices communicating with each other.

The mobile computing device 1850 includes a processor 1852, a memory 1864, an input/output device such as a display 1854, a communication interface 1866, and a transceiver 1868, among other components. The mobile computing device 1850 may also be provided with a storage device, such as a micro-drive or other device, to provide additional storage. Each of the processor 1852, the memory 1864, the display 1854, the communication interface 1866, and the transceiver 1868, are interconnected using various buses, and several of the components may be mounted on a common motherboard or in other manners as appropriate.

The processor 1852 can execute instructions within the mobile computing device 1850, including instructions stored in the memory 1864. The processor 1852 may be implemented as a chipset of chips that include separate and multiple analog and digital processors. The processor 1852 may provide, for example, for coordination of the other components of the mobile computing device 1850, such as control of user interfaces, applications run by the mobile computing device 1850, and wireless communication by the mobile computing device 1850.

The processor 1852 may communicate with a user through a control interface 1858 and a display interface 1856 coupled to the display 1854. The display 1854 may be, for example, a TFT (Thin-Film-Transistor Liquid Crystal Display) display or an OLED (Organic Light Emitting Diode) display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may provide communication with the processor 1852, so as to enable near area communication of the mobile computing device 1850 with other devices. The external interface 1862 may provide, for example, for wired communication in some implementations, or for wireless communication in other implementations, and multiple interfaces may also be used.

The memory 1864 stores information within the mobile computing device 1850. The memory 1864 can be implemented as one or more of a computer-readable medium or media, a volatile memory unit or units, or a non-volatile memory unit or units. An expansion memory 1874 may also be provided and connected to the mobile computing device 1850 through an expansion interface 1872, which may include, for example, a SIMM (Single In Line Memory Module) card interface. The expansion memory 1874 may provide extra storage space for the mobile computing device 1850, or may also store applications or other information for the mobile computing device 1850. Specifically, the expansion memory 1874 may include instructions to carry out or supplement the processes described above, and may include secure information also. Thus, for example, the expansion memory 1874 may be provided as a security module for the mobile computing device 1850, and may be programmed with instructions that permit secure use of the mobile computing device 1850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 1852), perform one or more methods, such as those described above. The instructions can also be stored by one or more storage devices, such as one or more computer- or machine-readable mediums (for example, the memory 1864, the expansion memory 1874, or memory on the processor 1852). In some implementations, the instructions can be received in a propagated signal, for example, over the transceiver 1868 or the external interface 1862.

The mobile computing device 1850 may communicate wirelessly through the communication interface 1866, which may include digital signal processing circuitry where necessary. The communication interface 1866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1868 using a radio-frequency. In addition, short-range communication may occur, such as using a Bluetooth®, Wi-Fi™, or other such transceiver (not shown). In addition, a GPS (Global Positioning System) receiver module 1870 may provide additional navigation- and location-related wireless data to the mobile computing device 1850, which may be used as appropriate by applications running on the mobile computing device 1850.

The mobile computing device 1850 may also communicate audibly using an audio codec 1860, which may receive spoken information from a user and convert it to usable digital information. The audio codec 1860 may likewise generate audible sound for a user, such as through a speaker, e.g., in a handset of the mobile computing device 1850. Such sound may include sound from voice telephone calls, may include recorded sound (e.g., voice messages, music files, etc.) and may also include sound generated by applications operating on the mobile computing device 1850.

The mobile computing device 1850 may be implemented in a number of different forms, as shown in the figure. For example, it may be implemented as a cellular telephone 1880. It may also be implemented as part of a smart-phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for automatically detecting a behavior of an individual, the method comprising:
capturing a sequence of obfuscated images of a field of view of a mobile electronic device positioned at a height within a predetermined range of acceptable vertical heights and at an angular orientation within a predetermined range of acceptable angular orientations, wherein:
the field of view comprises a space at least occasionally inhabited by the individual, and
the sequence of obfuscated images protects the privacy of the individual;
pre-processing the captured sequence of obfuscated images by a processor of a computing device prior to subsequent image processing, thereby altering image data of the sequence of obfuscated images;
automatically identifying, by the processor of the computing device, graphical elements of the sequence of obfuscated images corresponding to the individual moving within the field of view of the mobile electronic device;
automatically determining, by the processor of the computing device, one or more spatial measurements from one or more obfuscated images of the sequence of obfuscated images;
automatically determining, by the processor of the computing device, one or more body measurements (i) from the one or more determined spatial measurements and/or (ii) directly from two or more obfuscated images of the sequence of obfuscated images; and
automatically initiating, by the processor of the computing device, an event when the behavior of the individual is detected, wherein the behavior is detected by directly evaluating when at least one of the one or more determined body measurements and the one or more determined spatial measurements exceeds a threshold.

2. The method of claim 1, comprising determining, by the processor of the computing device, a change of one or more of the spatial measurements and/or one or more of the body measurements.

3. The method of claim 1, comprising storing a predetermined number of obfuscated images of the sequence of obfuscated images and purging other images to protect the individual's privacy.

4. The method of claim 1, comprising storing a sequence of obfuscated images corresponding to one or more particular detected behaviors at issue, and purging images that do not correspond to the one or more particular detected behaviors.

5. The method of claim 1, comprising transmitting, from the mobile electronic device, at least a portion of the sequence of obfuscated images to an external system or recipient.

6. The method of claim 1, comprising displaying graphics on a screen of the mobile electronic device while the sequence of obfuscated images is being captured.

7. The method of claim 1, wherein the sequence of obfuscated images is captured by a single camera and/or a single mobile electronic device.

8. A system comprising:
a processor; and a memory having instructions stored thereon, wherein the instructions, when executed by the processor, cause the processor to:
(a) identify, with a mobile electronic device, graphical elements of a sequence of obfuscated images obtained of a field of view of a camera of the mobile electronic device corresponding to an individual moving within the field of view of the mobile electronic device, wherein the sequence of obfuscated images protects the privacy of the individual;
(b) determine one or more spatial measurements from one or more obfuscated images of the sequence of obfuscated images;
(c) determine one or more body measurements (i) from the one or more determined spatial measurements and/or (ii) directly from two or more obfuscated images of the sequence of obfuscated images; and
(d) initiate an event upon detection of a behavior of the individual, wherein the behavior is detected by directly evaluating when at least one of the one or more determined body measurements and/or the one or more determined spatial measurements exceeds a threshold.

9. The system of claim 8, wherein the system further comprises the mobile electronic device.

10. The system of claim 8, wherein the instructions, when executed by the processor, cause the processor to determine a change of one or more of the spatial measurements and/or one or more of the body measurements.

11. The system of claim 8, wherein the instructions, when executed by the processor, cause the processor to store a predetermined number of obfuscated images of the sequence of obfuscated images and purge other obfuscated images to protect the individual's privacy.

12. The system of claim 8, wherein the instructions, when executed by the processor, cause the processor to store a sequence of obfuscated images corresponding to one or more particular detected behaviors at issue, and obfuscated purging images that do not correspond to the one or more particular detected behaviors.

13. The system of claim 8, wherein the instructions, when executed by the processor, cause the processor to transmit, from the mobile electronic device, at least a portion of the sequence of obfuscated images to an external system or recipient.

14. The system of claim 8, wherein the instructions, when executed by the processor, cause the processor to display graphics on a screen of the mobile electronic device while the sequence of obfuscated images is being captured.

15. The system of claim 8, wherein the sequence of obfuscated images is captured by a single camera and/or a single mobile electronic device.

16. A method for automatically detecting a behavior of an individual, the method comprising:
pre-processing a captured sequence of obfuscated images by a processor of a computing device prior to subsequent image processing, thereby altering image data of the sequence of obfuscated images, wherein the captured sequence of obfuscated images comprises a sequence of obfuscated images of a field of view of a mobile electronic device positioned at a height within a predetermined range of acceptable vertical heights and at an angular orientation within a predetermined range of acceptable angular orientations, wherein:
the field of view comprises a space at least occasionally inhabited by the individual, and
the sequence of obfuscated images protects the privacy of the individual;
automatically identifying, by the processor of the computing device, graphical elements of the sequence of obfuscated images corresponding to the individual moving within a field of view of the mobile electronic device;

automatically determining, by the processor of the computing device, one or more spatial measurements from one or more obfuscated images of the sequence of obfuscated images;

automatically determining, by the processor of the computing device, one or more body measurements (i) from the one or more determined spatial measurements and/or (ii) directly from two or more obfuscated images of the sequence of obfuscated images; and automatically initiating, by the processor of the computing device, an event when the behavior of the individual is detected, wherein the behavior is detected by directly evaluating when at least one of the one or more determined body measurements and the one or more determined spatial measurements exceeds a threshold.

* * * * *